(12) United States Patent
Okada

(10) Patent No.: US 9,852,651 B2
(45) Date of Patent: Dec. 26, 2017

(54) PRACTICE SUPPORT DEVICE AND PRACTICE SUPPORT METHOD FOR WIND INSTRUMENT PERFORMER

(71) Applicant: Panasonic Intellectual Property Corporation of America, Torrance, CA (US)

(72) Inventor: Masashi Okada, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 15/415,992

(22) Filed: Jan. 26, 2017

(65) Prior Publication Data
US 2017/0236442 A1  Aug. 17, 2017

(30) Foreign Application Priority Data

Feb. 16, 2016 (JP) .................................. 2016-027380
Oct. 14, 2016 (JP) .................................. 2016-202557

(51) Int. Cl.
*G10H 3/00* (2006.01)
*G09B 15/00* (2006.01)
*G09B 5/02* (2006.01)
*G10H 1/00* (2006.01)

(52) U.S. Cl.
CPC .............. *G09B 15/00* (2013.01); *G09B 5/02* (2013.01); *G10H 1/0008* (2013.01); *G10H 2210/091* (2013.01); *G10H 2220/091* (2013.01); *G10H 2220/361* (2013.01); *G10H 2220/455* (2013.01)

(58) Field of Classification Search
CPC ....... G10H 2210/091; G10H 2220/455; G10H 1/368; G10H 2250/511; G10H 2210/031; G10G 3/04
See application file for complete search history.

(56) References Cited

U.S. PATENT DOCUMENTS

2013/0098225 A1* 4/2013 Murphy ................. G09B 15/00
84/470 R
2014/0311322 A1* 10/2014 De La Gorce ....... G10H 1/0008
84/626

FOREIGN PATENT DOCUMENTS

JP        2002-091290        3/2002

* cited by examiner

*Primary Examiner* — Marlon Fletcher
(74) *Attorney, Agent, or Firm* — Greenblum & Bernstein, P.L.C.

(57) ABSTRACT

A device that supports a performer of a wind instrument, the device including: a processor; and a memory, in which the processor acquires data indicating a myoelectric potential value measured by, a myoelectric sensor arranged on a surface of the face of a performer, the memory stores a table including a listing of conditions for the myoelectric potential value and a corresponding listing of support information for playing the wind instrument, and the processor determines whether the acquired myoelectric potential value satisfies at least a portion of a target condition included in the listing of conditions, determines support information corresponding to the target condition, when the acquired myoelectric potential value is determined to satisfy the at least a portion of the target condition, generates a support image corresponding to the determined support information, and controls a display to display the generated support image.

20 Claims, 13 Drawing Sheets

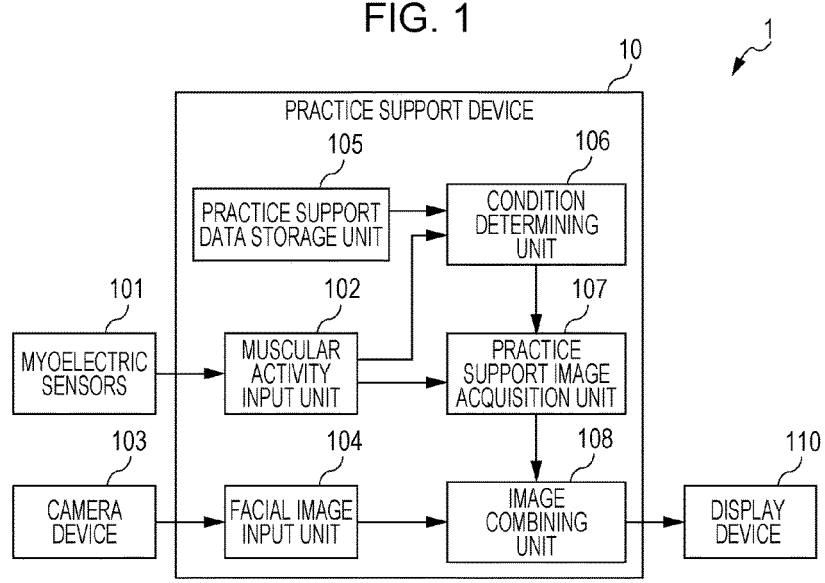

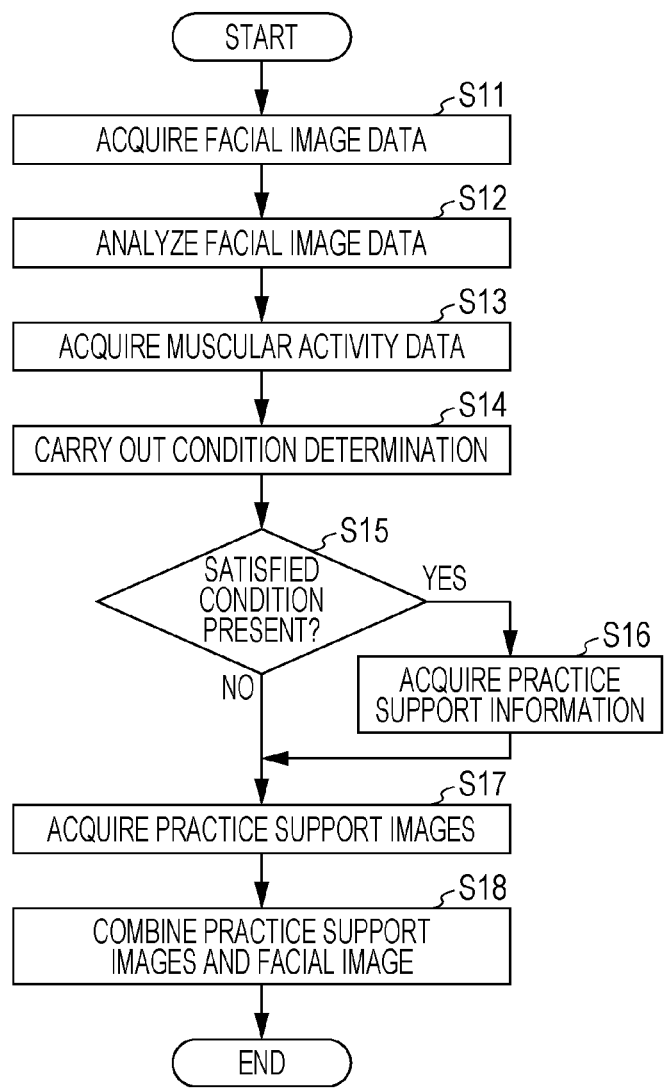

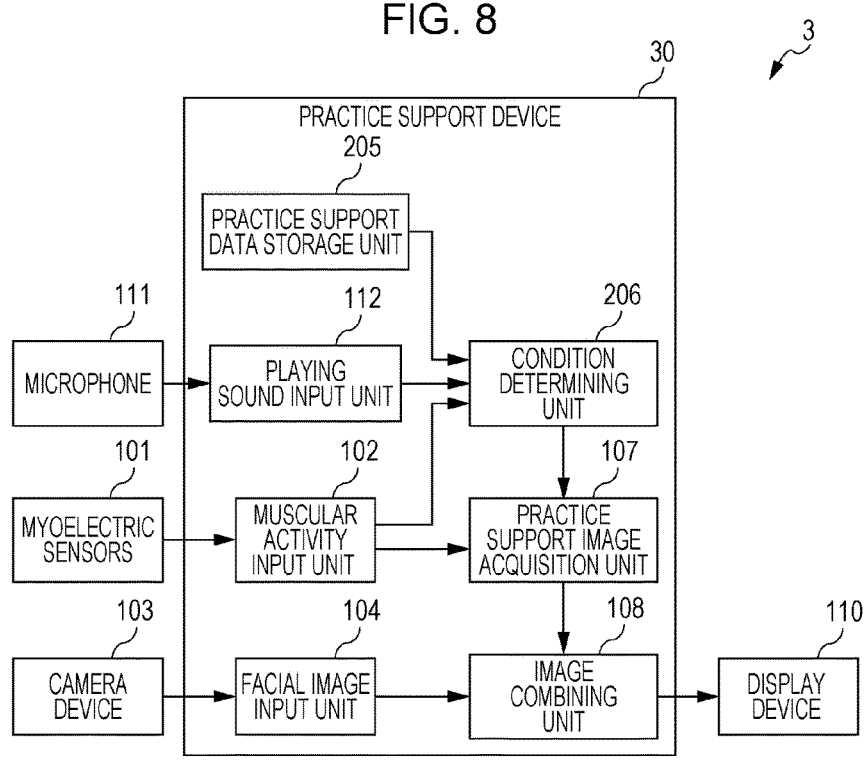

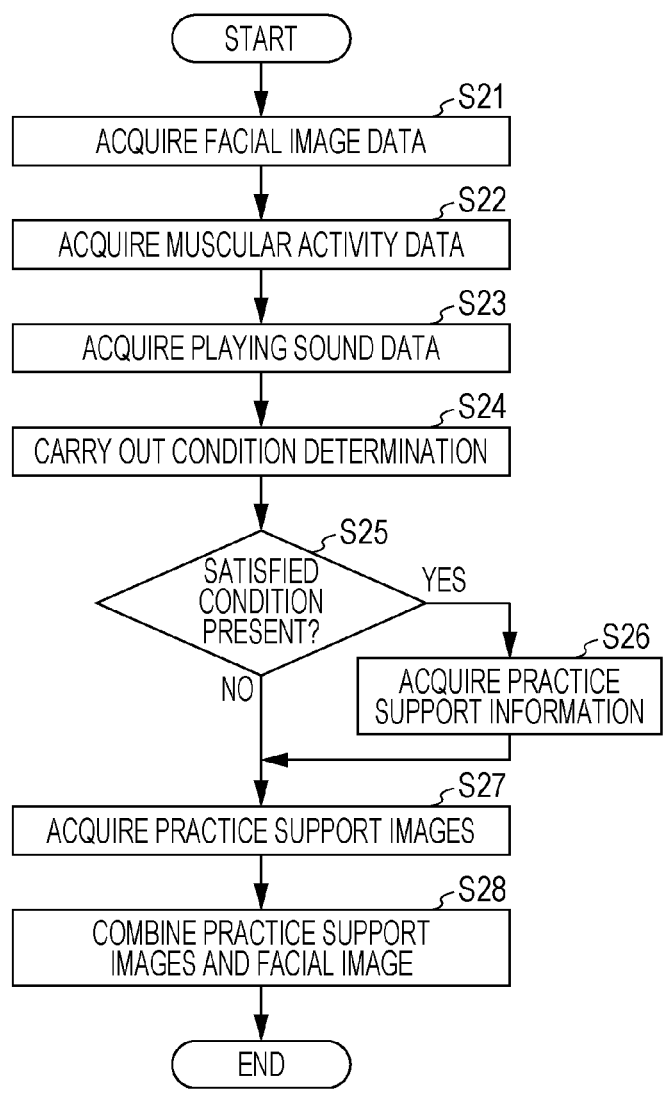

FIG. 13

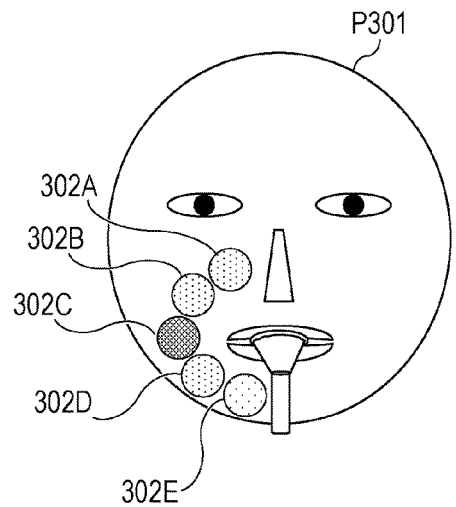

FIG. 14

| CONDITIONS | PRACTICE SUPPORT INFORMATION | |
| --- | --- | --- |
| | TEXT INFORMATION | IMAGE INFORMATION |
| MUSICAL INSTRUMENT CHANGES FROM ABSENT TO PRESENT, AND MYOELECTRIC POTENTIAL OF ANY REGION CHANGES | THE EMBOUCHURE IS NOT CORRECT IMMEDIATELY AFTER PRODUCING SOUND. TRY TO PROPERLY PREPARE THE EMBOUCHURE BEFORE PRODUCING SOUND. | CHANGE COLOR OF GRAPHIC CORRESPONDING TO REGION WHERE MYOELECTRIC POTENTIAL CHANGED |
| MUSICAL INTERVAL OF MUSICAL INSTRUMENT SOUND RISES, AND MYOELECTRIC POTENTIAL OF LEVATOR LABII SUPERIORIS MUSCLE RISES | THE UPPER LIP IS TENSING TOO MUCH WHEN THERE IS A JUMP IN SOUND. TRY NOT TO TENSE TOO MUCH. | CHANGE COLOR OF GRAPHIC CORRESPONDING TO LEVATOR LABII SUPERIORIS MUSCLE |

FIG. 19

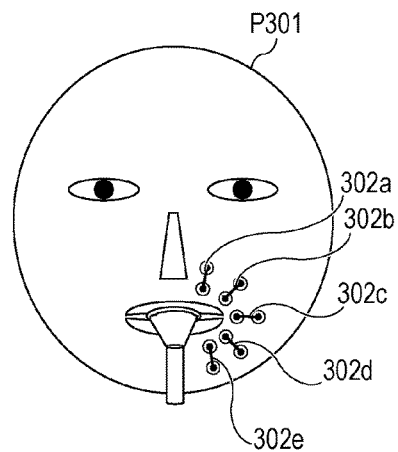

FIG. 20

| CONDITIONS | PRACTICE SUPPORT INFORMATION | |
|---|---|---|
| | TEXT INFORMATION | IMAGE INFORMATION |
| MUSICAL INTERVAL OF MUSICAL INSTRUMENT SOUND CHANGES, AND NO CHANGE IN MOVEMENT OF SKIN SURFACE OF RISORIUS MUSCLE | TRY TO CHANGE THE POSITIONS OF THE CORNERS OF THE MOUTH ACCORDING TO THE PITCH OF THE SOUND. | CHANGE GRAPHIC CORRESPONDING TO ACTIVITY OF RISORIUS MUSCLE TO ARROW MARK |
| MUSICAL INTERVAL OF MUSICAL INSTRUMENT SOUND CHANGES, AND CHANGE IN MOVEMENT OF SKIN SURFACE OF REGION OTHER THAN RISORIUS MUSCLE | TRY TO KEEP THE SHAPE AROUND THE LIPS CONSTANT. | CHANGE COLOR OF GRAPHIC CORRESPONDING TO CHANGED REGION |

PRACTICE SUPPORT DEVICE AND PRACTICE SUPPORT METHOD FOR WIND INSTRUMENT PERFORMER

BACKGROUND

1. Technical Field

The present disclosure relates to a device and a method for supporting practice of the playing of a wind instrument, and particularly relates to a practice support device and a practice support method with which information that supports practice of the playing of a wind instrument is presented by means of images.

2. Description of the Related Art

A playing display device that presents differences between user playing and model playing has been proposed as prior art relating to supporting practice of the playing of a musical instrument (for example, see Japanese Unexamined Patent Application Publication No. 2002-91290). In Japanese Unexamined Patent Application Publication No. 2002-91290, the loudness, musical intervals, and generation timings of sound are extracted from input user playing sound, and images arranged in positions corresponding to musical intervals and generation timings are generated with display graphics corresponding to the loudness and the musical intervals. Images are similarly generated also for model playing sound, and the images for the user playing sound and the images for the model playing sound are combined and displayed.

SUMMARY

However, further improvement has been required in the aforementioned prior art.

In one general aspect, the techniques disclosed here feature a device that supports a performer of a wind instrument, the device including: a processor; and a memory, wherein the processor acquires data indicating a myoelectric potential value measured by a myoelectric sensor arranged on a surface of a face of the performer, the memory stores a table including a listing of conditions for the myoelectric potential value and a corresponding listing of support information for playing the wind instrument, and the processor determines whether the acquired myoelectric potential value satisfies at least a portion of a target condition included in the listing of conditions, determines support information corresponding to the target condition, when the acquired myoelectric potential value is determined to satisfy the at least a portion of the target condition, generates a support image corresponding to the determined support information, and controls a display to display the generated support image.

These general and specific aspects may be implemented using a system, a method, and a computer program, and any combination of systems, methods, and computer programs.

According to the practice support device of the present disclosure, muscular activity of the face when playing and differences with a model are presented to a performer or an instructor.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 1 is a block diagram depicting an example of a configuration of a practice support device for a wind instrument in embodiment 1;

FIG. 2 is a drawing depicting an example of practice support data that is stored in a practice support data storage unit in embodiment 1;

FIG. 7 is a flowchart depicting an example of an operation of the practice support device in embodiment 2;

FIG. 8 is a block diagram depicting an example of a configuration of a practice support device for a wind instrument in embodiment 3;

FIG. 9 is a drawing depicting an example of practice support data that is stored in a practice support data storage unit in embodiment 3;

FIG. 10 is a flowchart depicting an example of an operation of the practice support device in embodiment 3;

FIG. 13 is a drawing depicting an example of visualized muscular activity in a specific example of a mode of use of the aforementioned practice support device;

FIG. 14 is a drawing depicting an example of practice support data that is referenced in a specific example of a mode of use of the aforementioned practice support device;

FIG. 19 is a drawing depicting an example of visualized muscular activity in a specific example of a mode of use of the aforementioned practice support device;

FIG. 20 is a drawing depicting another example of practice support data that is referenced in a specific example of a mode of use of the aforementioned practice support device;

Figure 3:
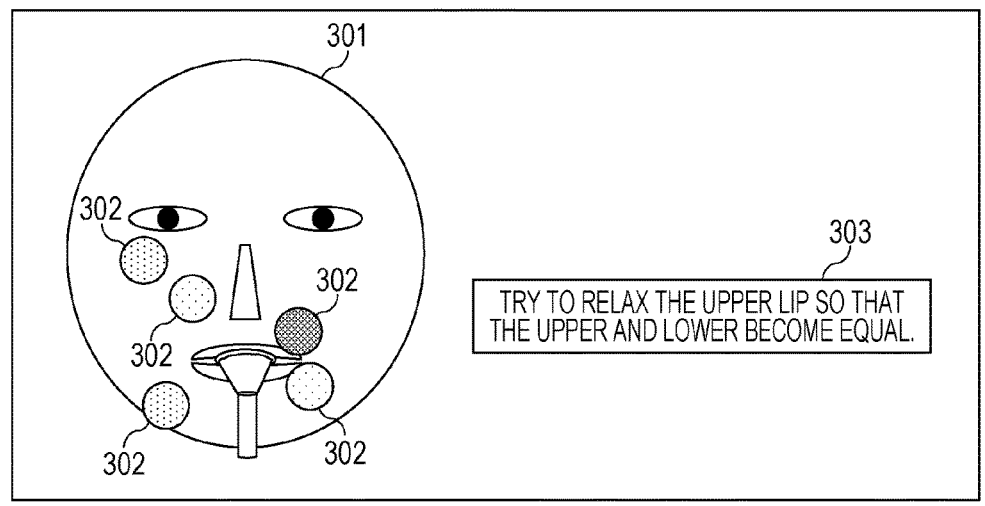
FIG. 3 is a drawing depicting an example of an image that is output by an image combining unit in embodiment 1.

DETAILED DESCRIPTION (Findings Forming the Basis for the Present Disclosure)

In the technique of the aforementioned Japanese Unexamined Patent Application Publication No. 2002-91290, user playing sound played by the user and model playing sound serve as input, and the loudness, musical intervals, and generation timings thereof are combined and displayed. However, in wind instruments that produce sound using a flow of exhaled air, activating the muscles of the face, particularly the mimetic muscles, in an appropriate manner and causing the lips or a reed to vibrate is regarded as being an important element for good playing.

Hence, the present inventor investigated the following measures for improvement.

(1) A device according to an aspect of the present disclosure is a device that supports a performer of a wind instrument, the device including: a processor; and a memory, wherein the processor acquires data indicating a myoelectric potential value measured by a myoelectric sensor arranged on a surface of a face of the performer, the memory stores a table including a listing of conditions for the myoelectric potential value and a corresponding listing of support information for playing the wind instrument, and the processor determines whether the acquired myoelectric potential value satisfies at least a portion of a target condition included in the listing of conditions, determines support information corresponding to the target condition, when the acquired myoelectric potential value is determined to satisfy the at least a portion of the target condition, generates a support image corresponding to the determined support information, and controls a display to display the generated support image.

(2) In the aforementioned aspect, the processor, further may acquire, from a microphone, sound of the wind instrument captured by the microphone, the processor further may determine whether the acquired sound of the wind instrument satisfies another portion of the target condition, and when the processor determines that the acquired sound of the wind instrument satisfies the other portion of the target condition, the processor may generate the support image.

(3) In the aforementioned aspect, the at least a portion of the target condition may include a change in the myoelectric potential value, or a magnitude of the change in the myoelectric potential value that is equal to or greater than a predetermined threshold value.

(4) In the aforementioned aspect, the myoelectric sensor may measure the myoelectric potential value of one or more muscles from among a levator labii superioris muscle, a zygomaticus major muscle, a risorius muscle, a depressor anguli oris muscle, and a depressor labii inferioris muscle of the performer, the change of the myoelectric potential value of the at least a portion of the target condition is a change of the myoelectric potential value of any of the levator labii superioris muscle, the zygomaticus major muscle, the risorius muscle, the depressor anguli oris muscle, and the depressor labii inferioris muscle, the other portion of the target condition is a change in sound level from being absent to being present, and the support image includes a facial image of the performer, with a part of the facial image corresponding to a muscle in which the myoelectric potential value has changed being emphasized.

(5) In the aforementioned aspect, the myoelectric sensor may measure the myoelectric potential value of a levator labii superioris muscle of the performer, the change of the myoelectric potential value of the at least a portion of the target condition is a change of the myoelectric potential value of the levator labii superioris muscle, the other portion of the target condition is a change in pitch of the wind instrument, and the support image includes a facial image of the performer, with a part of the facial image corresponding to the levator labii superioris muscle being emphasized.

(6) In the aforementioned aspect, the processor may determine whether the acquired sound of the wind instrument satisfies the other portion of the target condition when the acquired sound of the wind instrument is equal to or greater than a predetermined magnitude.

(7) In the aforementioned aspect, the processor further may acquire an image captured by a camera, and the processor may determine whether the acquired myoelectric potential value satisfies the at least a portion of the target condition when a facial image of the performer is included in the image.

(8) In the aforementioned aspect, the support image may include a facial image of the performer.

(9) In the aforementioned aspect, the support information may include, as text information, advice regarding how to move a muscle corresponding to the target condition, and the support image includes the text information.

(10) In the aforementioned aspect, the support information may include, as text information, advice regarding how to move a muscle corresponding to the condition, and the processor may cause a speaker corresponding to the device to output the text information using speech.

(11) A device according to another aspect of the present disclosure is a device that supports a performer of a wind instrument, the device including: a processor; and a memory, wherein the processor acquires an image including a facial image of the performer, from a camera that captures images of the performer, the memory stores a table including a listing of conditions for a muscle length and a corresponding listing of support information for playing the wind instrument, and the processor determines a muscle length of a target muscle included in the facial image based on positions of a plurality of feature points in the facial image, determines whether the determined muscle length satisfies at least a portion of a target condition included in the listing of conditions, determines support information corresponding to the target condition, when the determined muscle length is determined to satisfy the at least a portion of the target condition, generates a support image corresponding to the determined support information, and controls a display to display the generated support image.

(12) In the aforementioned aspect, the processor further may acquire, from a microphone, sound of the wind instrument captured by the microphone, the processor further may determine whether the acquired sound of the wind instrument satisfies another portion of the target condition, and when the processor may determine that the acquired sound of the wind instrument satisfies the other portion of the target condition, the processor may generate the support image.

(13) In the aforementioned aspect, the at least a portion of the target condition may include a change in the muscle length, or a magnitude of the change in the muscle length that is equal to or greater than a predetermined threshold value.

(14) In the aforementioned aspect, the processor may determine the muscle length of a risorius muscle of the performer, the change in the muscle length of the at least a portion of the target condition is no change in the muscle length of the risorius muscle, the other portion of the target condition is a change in pitch of the sound of the wind instrument changes, and the support image may include the facial image, with a part of the facial image corresponding to a corner of a mouth being emphasized.

(15) In the aforementioned aspect, the processor may determine the muscle length of one or more muscles from among a levator labii superioris muscle, a zygomaticus major muscle, a depressor anguli oris muscle, and a depressor labii inferioris muscle of the performer, the change of the muscle length of the at least a portion of the target condition is a change in the muscle length of any of the levator labii superioris muscle, the zygomaticus major muscle, the depressor anguli oris muscle, and the depressor labii inferioris muscle, the other portion of the target condition is a change in pitch of the sound of the wind instrument, and the support image may include the facial image of the performer, with a part of the facial image corresponding to a muscle of which the muscle length has changed being emphasized.

(16) In the aforementioned aspect, the processor may determine whether the acquired sound of the wind instrument satisfies the other portion of the target condition when the acquired sound of the wind instrument is equal to or greater than a predetermined magnitude.

(17) In the aforementioned aspect, the support image may include the facial image.

(18) In the aforementioned aspect, the support information may include, as text information, advice regarding how to move a muscle corresponding to the target condition, and the support image includes the text information.

(19) In the aforementioned aspect, the support information may include, as text information, advice regarding how to move a muscle corresponding to the target condition, and the processor causes a speaker to output a sound signal corresponding to the text information.

Hereinafter, embodiments of the present disclosure will be described with reference to the drawings.

Embodiment 1

[Configuration]

FIG. 1 is a block diagram depicting an example of a configuration of a practice support device for a wind instrument in an embodiment of the present disclosure. In FIG. 1, a practice support system 1 for a wind instrument is provided with a practice support device 10, myoelectric sensors 101, a camera device 103, and a display device 110.

The practice support device 10 is provided with a muscular activity input unit 102, a facial image input unit 104, a practice support data storage unit 105, a condition determining unit 106, a practice support image acquisition unit 107, and an image combining unit 108.

The myoelectric sensors 101 are electromyographs that measure the myoelectric potential of one or more muscles of the face of a performer who is playing a wind instrument, and measurement data of this myoelectric potential is output as data indicating the activity of the muscles (hereinafter, referred to as muscular activity data). In the present embodiment, muscular activity is expressed as a value for myoelectric potential. The myoelectric sensors 101 are an example of a muscular activity measuring instrument in the present embodiment.

The muscular activity input unit 102 receives input of muscular activity data that is output from the myoelectric sensors 101.

The camera device 103 is provided with an image sensor, captures a facial image of the performer when playing a wind instrument, and outputs data of this facial image (hereinafter, referred to as facial image data).

The facial image input unit 104 receives input of facial image data that is output from the camera device 103, and outputs this facial image data to the image combining unit 108.

The practice support data storage unit 105 associates and stores, as practice support data, conditions having muscular activity as a variable (hereinafter, also referred to as muscular activity conditions) and practice support information. The details of the muscular activity conditions and the practice support information will be described hereinafter using the drawings.

The condition determining unit 106 carries out a condition determination using the muscular activity data received from the muscular activity input unit 102 and the muscular activity conditions included in the practice support data stored in the practice support data storage unit 105, and outputs practice support information associated with the determination result.

The practice support image acquisition unit 107 acquires practice support images on the basis of the muscular activity data received from the muscular activity input unit 102 and the practice support information received from the condition determining unit 106.

The image combining unit 108 combines the practice support images acquired by the practice support image acquisition unit 107 and the facial image of the performer received from the facial image input unit 104, and outputs the resulting composite image obtained therefrom to the display device 110. The display device 110 is provided with a display unit, and displays the composite image received from the image combining unit 108 on the display unit.

It should be noted that, in the configuration of FIG. 1, the practice support device 10 receives input of muscular activity and a facial image directly from the myoelectric sensors 101 and the camera device 103; however, the present disclosure is not restricted thereto. For example, recorded video data of facial images of the performer while playing may be combined with time-sequential data of muscular activity concurrently measured by the myoelectric sensors 101, and temporarily stored in an external storage device 405 (described hereinafter). The practice support device 10 may then carry out processing for reading out data of the muscular activity and facial images stored in the external storage device 405, according to the time-sequential order of playing, to display practice support images.

FIG. 2 is a drawing depicting an example of the conditions and practice support information stored in the practice support data storage unit 105 in the present embodiment.

The practice support data storage unit 105 associates and stores the muscular activity conditions and the practice support information as practice support data 1050. It should be noted that, in FIG. 2, the muscular activity conditions and practice support information in each data row of the table are associated.

In the muscular activity conditions, muscular activity is given in a form corresponding to muscular activity data from the myoelectric sensors 101, and is given as myoelectric potential in the present embodiment, for example. The practice support information associated with the muscular activity conditions includes text information and image information. The text information is an example of language-dependent information relating to the muscular activity included in the muscular activity conditions, presented to the performer when a muscular activity condition has been satisfied. The image information is information relating to images such as graphics with which muscular activity is visualized, and is information indicating a display mode for emphasizing a part requiring attention, for example, when a muscular activity condition has been satisfied.

It should be noted that the content of the practice support information is not restricted to only the aforementioned, and, for example, an ID that uniquely identifies a muscular activity condition may also be included. In this case, the condition determining unit 106 notifies the practice support image acquisition unit 107 of an ID corresponding to a muscular activity condition satisfied by the input muscular activity. The practice support image acquisition unit 107 may use the notified ID, access the practice support data storage unit 105 to refer to the practice support data 1050, and read out the practice support information. Alternatively, the practice support information may be only text information or only image information.

Furthermore, the configuration of the practice support data 1050 is not restricted to a table that is used as a database such as that depicted in FIG. 2. For example, the practice support data 1050 may constitute a portion of a program described hereinafter for realizing the practice support device 10, and may be configured as conditional expressions corresponding to each condition included in this table, and control instructions corresponding to the content of the practice support information associated with the condition in question.

FIG. 3 is an example of a composite image that is output by the image combining unit 108 to the display device 110 and displayed thereon in the present embodiment.

In FIG. 3, an image 301 is a facial image of the performer while playing, received by the image combining unit 108 from the facial image input unit 104. It should be noted that the facial image is schematically depicted in the present drawing.

Furthermore, images 302 are graphics with which muscular activity of the face when playing is visualized, received by the image combining unit 108 from the practice support image acquisition unit 107. The display form (color, shape, or the like) of the images 302 is decided according to the image information of the practice support information. For example, the colors of the images 302 may be changed according to the level of muscular activity. When there is a condition that has been satisfied by muscular activity that has been input to the practice support data 1050, the practice support image acquisition unit 107 changes the corresponding image 302 to an image 302 having a different display form, in accordance with the image information of the practice support information associated with that satisfied muscular activity condition, and outputs the image 302 to the image combining unit 108.

Furthermore, an image 303 is obtained by, in the practice support data 1050, text information of the practice support information associated with the satisfied muscular activity condition being visualized and acquired by the practice support image acquisition unit 107 and output to the image combining unit 108. The image combining unit 108 calculates the position (coordinates) on the facial image where the images 302 are to be arranged, arranges the images 302 in those positions, and additionally arranges the image 303 in a predetermined position to thereby obtain a composite image such as that depicted in FIG. 3.

It should be noted that the practice support information may be only text information or only image control information. Furthermore, speech information may be included in the practice support information instead of or in addition to the text information. Speech information is also an example of language-dependent information that is presented to the performer. Furthermore, speech information may be presented to a user such as a performer by having text information read aloud by a read-aloud unit (not depicted), or by having speech, which is produced by the playback of speech information, output from a speech output device (not depicted). Furthermore, the content of the practice support information is not restricted to the example depicted in FIG. 3, and need only be information that can be used in order for images or speech such as the aforementioned to be output by the practice support image acquisition unit 107 and the image combining unit 108, which are realized by execution of a program described hereinafter for realizing the practice support device 10. For example, the content of the practice support information may be information indicating the save location for data of an image, text, or speech that is output when an associated muscular activity condition has been satisfied.

Furthermore, the composite image including the images 302 with which muscular activity is visualized may be constantly displayed not only when a muscular activity condition of the practice support data has been satisfied but also when there is input of muscular activity data from the myoelectric sensors 101. Also, when a muscular activity condition of the practice support data has been satisfied, an image 302 in a position corresponding to a muscle included in the muscular activity condition may be changed to a specific color or shape, and a composite image additionally including text information may be displayed.

Furthermore, the method for visualizing muscular activity is not restricted to the aforementioned method that uses a change in the color of a graphic. For example, muscular activity may be expressed by means of the area of a graphic. In this case also, it is possible for the practice support image acquisition unit 107 to be made to enlarge or shrink a graphic using the image information. Furthermore, muscular activity may be visualized by combining a plurality of graphics. For example, a graph may be formed by combining a plurality of graphics to express time-sequential changes in muscular activity or differences among muscles. In this case also, the color, shape, or size of the graphics making up the graph may be changed using the image information. In addition, the method for visualizing muscular activity may be changed according to the image information. For example, it is also possible for a graph to be used when a specific condition has been satisfied. There are cases where this kind of graph may have a large display range, and therefore may be displayed without being superimposed on a facial image of the performer.

Figure 4:
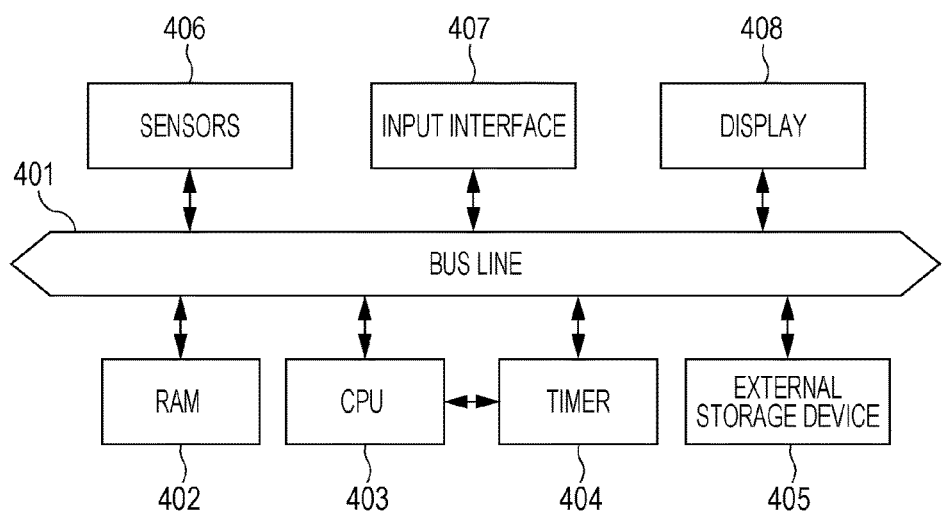
FIG. 4 is a drawing depicting an example of a hardware configuration of an information processing device provided with the practice support device in embodiment 1.

FIG. 4 is a drawing depicting an example of a hardware configuration of an information processing device that realizes the practice support device 10 in the present embodiment.

The practice support device 10 is realized by the execution of a program for supporting practice of the playing of a wind instrument (hereinafter, referred to as a practice support program), by an information processing device that has input/output devices such as a display, a camera, and electromyographs mounted thereon or connected thereto, for example.

In FIG. 4, the information processing device is provided with a central processing unit (CPU) 403, a random-access memory (RAM) 402, a timer 404, the external storage device 405, sensors 406, an input interface 407, and a display 408. These devices are connected to each other through a bus line 401.

The timer 404 controls program interrupt timings and the like.

The external storage device 405 is an optical disk drive such as a hard disk drive (HDD), a semiconductor storage device or the like, or a combination of these. The practice support program and the practice support information are stored in the external storage device 405. The external storage device 405 is an example of a memory in the present embodiment.

The CPU 403 reads out the practice support program and the practice support information stored in the external storage device 405, and executes processing specified by the practice support program while writing the read-out program or information to the RAM 402 as required.

The sensors 406 are the myoelectric sensors 101 and the camera device 103 of FIG. 1, which constitute input devices.

The input interface 407 is a mouse, a keyboard, a touch panel, or the like for the user to operate the practice support device 10.

The display 408 is the display device 110 of FIG. 1, and displays a composite image that includes support images, exemplified in FIG. 3. Furthermore, the display 408 displays an operation screen or the like of the practice support device 10.

The CPU 403 executes processing specified by the practice support program with the RAM 402 serving as a work area, thereby realizing the muscular activity input unit 102, the facial image input unit 104, the condition determining unit 106, the practice support image acquisition unit 107, and the image combining unit 108 in the present embodiment. More specifically, the CPU 403 executing the practice support program performs, in accordance with operational input from the input interface 407, the processing of data input from the sensors 406, the condition determination and the acquisition of support images with reference being made to the practice support data, the combining for the composite image, and image display control for displaying various types of operation screens and the composite image on the display 408. The CPU 403 is an example of a processor in the present embodiment. Furthermore, an input port of the CPU 403 is an example of a first input circuit in the present embodiment.

[Operation]

Figure 5:
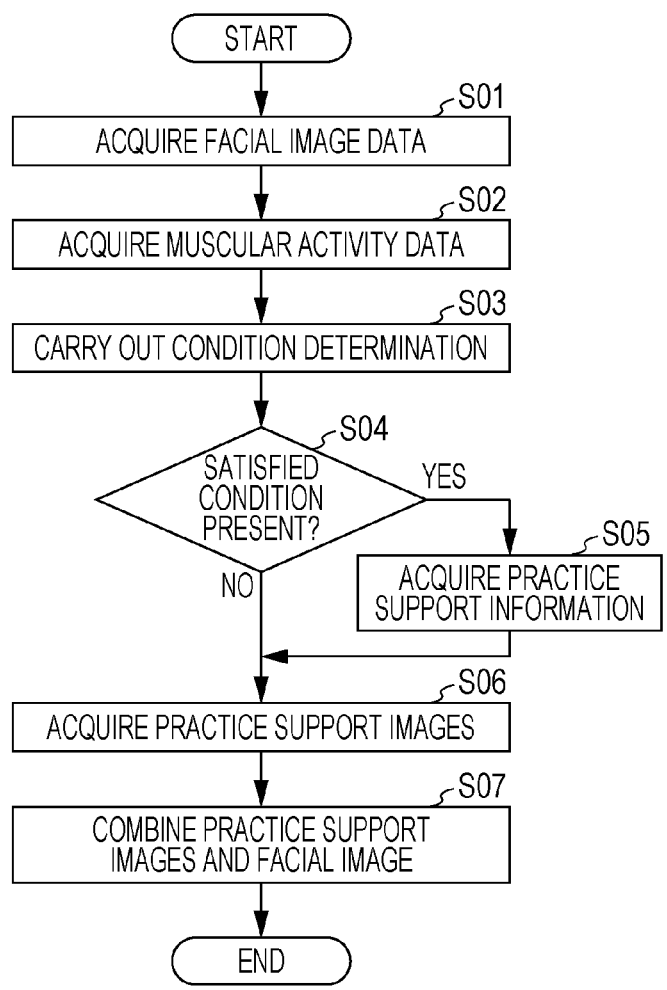
FIG. 5 is a flowchart depicting an example of an operation of the practice support device in embodiment 1.

FIG. 5 is a flowchart depicting an example of an operation of the practice support device 10 in the present embodiment. With a control signal from the timer 404 serving as a trigger, a series of processing for supporting practice is interrupt-executed by the CPU 403.

First, in step S01, the facial image input unit 104 acquires facial image data indicating a facial image captured by the camera device 103, and outputs this facial image data to the image combining unit 108. Furthermore, in step S02, the muscular activity input unit 102 acquires muscular activity data indicating muscular activity measured by the myoelectric sensors 101, and outputs this muscular activity data to the condition determining unit 106 and the practice support image acquisition unit 107.

Next, in step S03, the condition determining unit 106 refers to the practice support data 1050 stored in the practice support data storage unit 105, and determines whether or not the muscular activity indicated by the muscular activity data input in step S02 satisfies a muscular activity condition included in the practice support data 1050. This condition determination is carried out on the basis of whether or not there is a change in myoelectric potential or the magnitude of a change in myoelectric potential.

Next, in step S04, the practice support image acquisition unit 107 determines whether or not there is a muscular activity condition determined as having been satisfied as a result of the condition determination in step S03. When there is such a muscular activity condition (yes in step S04), the practice support image acquisition unit 107 acquires the practice support information associated with the satisfied muscular activity condition in the practice support data 1050 (step S05).

Next, in step S06, the practice support image acquisition unit 107 visualizes the muscular activity data acquired in step S02 and the practice support information acquired in step S05, in other words, acquires practice support images, and outputs these practice support images to the image combining unit 108.

Lastly, in step S07, the image combining unit 108 combines the practice support images that are input from the practice support image acquisition unit 107 and a facial image that is input from the facial image input unit 104, and outputs the thus obtained composite image to be displayed by the display device 110.

It should be noted that either a normal image or a mirror image may be output as a facial image 301. For example, switching may be enabled in such a way that a normal image is displayed when the instructor views the composite image, and a mirror image is displayed when the performer views the composite image. Furthermore, the display device 110 connected to the practice support device 10 may be a mirror with which information based on text, graphics, or the like can be presented on the mirror surface together with a mirror image in which the surroundings are reflected, or the practice support images may be displayed together with a mirror image of the performer reflected on this mirror surface.

(Effects)

According to this configuration, the practice support device 10 in the present embodiment is able to visualize, in a form that is easy to intuitively understand, muscular activity of the face of a performer when playing a wind instrument, acquired from electromyographs, and is also able to superimpose and display said muscular activity in an appropriate position on a facial image of the performer obtained when playing, acquired from the camera device 103. Thus, the performer or instructor who is the user of the practice support device 10 is able to easily and accurately comprehend the muscular activity of the performer when playing a wind instrument.

In addition, when the present muscular activity is in a specific state, for example, when in a state that is undesirable as a state during playing, the practice support device 10 is able to display text information having content that is advice for rectifying that state. In addition, when the present muscular activity is in a specific state, for example, when in a state that is undesirable as a state during playing, it is possible for a part to which the user should pay attention to be displayed in an emphasized manner, using the image control information. As a result, muscular activity of the face when playing, and differences with a model state or an ideal state, can be presented to the user in an easy to understand manner.

Furthermore, time-sequential data of muscular activity and facial images obtained while playing may be temporarily stored in the external storage device 405 and then used. In this case, in the practice support device 10, muscular activity data and facial image data obtained while playing and stored in the external storage device 405 are read out according to the time-sequential order of playing for the aforementioned series of processing to be carried out, and a composite image that includes practice support images is thereby output. That is, a composite image is generated using practice support images that are acquired retrospectively using muscular activity data and facial image data obtained when playing and recorded in the external storage device 405, and it is thereby possible to realize a review playback function for a composite image that includes practice support images. In addition, data of the composite image is saved in the external storage device 405, the composite image is displayed by means of an operation screen that includes a play button, a stop button, a seek bar, and the like that are operated by means of an input interface, and it is thereby also possible to provide functions for stopping at any playback location and playing from any playback location.

It should be noted that the facial image 301 included in the composite image is by no means restricted to an image that is extracted from the time-sequential data of facial images of the performer obtained when playing. For example, a still image of the face of the performer, an illustrated image representing the face, or the like may be used. These kinds of images are useful when it is difficult to acquire or record time-sequential data of facial images, such as when the camera device 103 is not mounted on or cannot even be connected to the practice support device 10, when the environment of the playing location is unsuitable for capturing images, when the position of the face of the performer is far away or liable to move, or when there is a limit to the storage capacity of the external storage device 405, for example.

Embodiment 2

[Configuration]

In embodiment 1, electromyographs are used to acquire muscular activity data and as input means. In the present embodiment, an explanation will be given regarding a configuration in which a camera device and facial image analysis are used for the acquisition of muscular activity data and as an input means.

Figure 6:
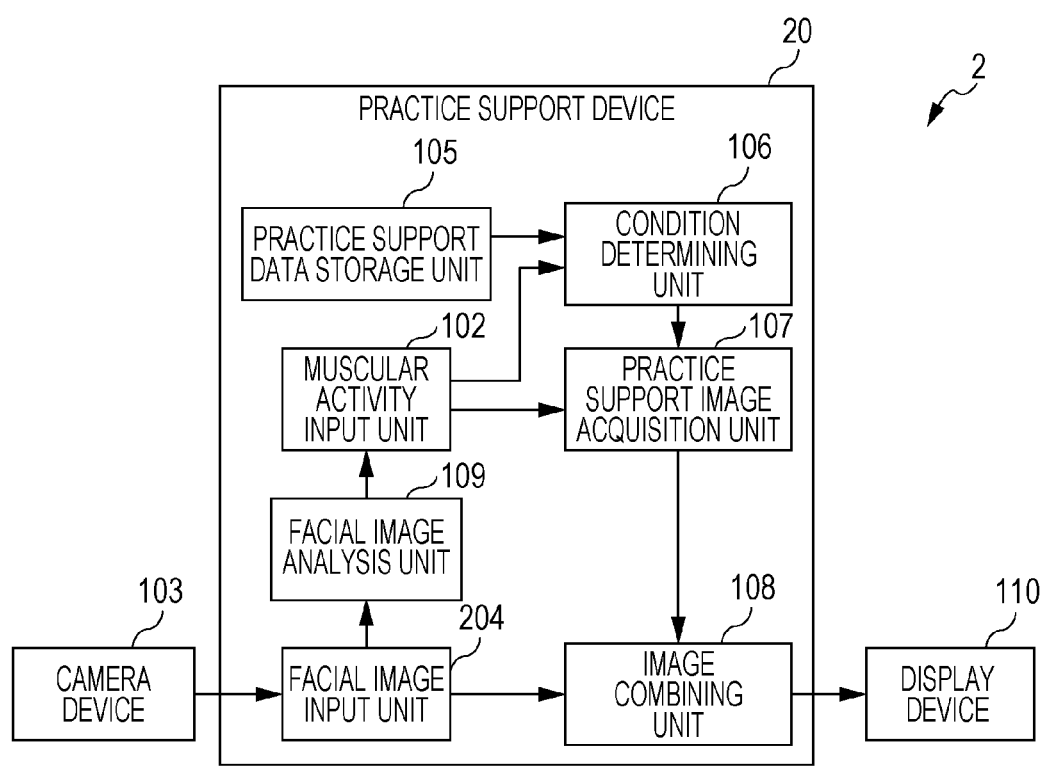
FIG. 6 is a block diagram depicting an example of a configuration of a practice support device for a wind instrument in embodiment 2.

FIG. 6 is a block diagram depicting an example of a configuration of a practice support device 20 for a wind instrument in the present embodiment. In FIG. 6, a practice support system 2 for a wind instrument is provided with the practice support device 20, the camera device 103, and the display device 110.

The practice support device 20 is provided with the muscular activity input unit 102, a facial image input unit 204, the practice support data storage unit 105, the condition determining unit 106, the practice support image acquisition unit 107, the image combining unit 108, and a facial image analysis unit 109. Constituent elements common to embodiment 1 are denoted using common reference numerals and explanations thereof are omitted.

In FIG. 6, the facial image input unit 204 receives input of facial image data captured and acquired by the camera device 103.

The facial image input unit 204 outputs the input facial image data to the facial image analysis unit 109 and the image combining unit 108.

The facial image analysis unit 109 receives input of the facial image data of the performer obtained when playing, from the facial image input unit 204. The facial image analysis unit 109 performs analysis processing on the input facial image data to thereby acquire muscular activity data that indicates the muscular activity of the face of the performer, and outputs this muscular activity data to the muscular activity input unit 102. More specifically, the facial image analysis unit 109 performs face recognition processing on the input facial image data, extracts two feature points for each muscle of interest on the surface of the recognized face, and acquires the positions thereof. In addition, the facial image analysis unit 109 calculates, with respect to one or more sets of feature points, an inter-point distance on the basis of the positions thereof to thereby calculate the muscle length of a muscle of interest, and outputs data regarding the calculated muscle length to the muscular activity input unit 102 as muscular activity data. In the present embodiment, muscular activity is expressed as a value for muscle length obtained by means of facial image analysis. Thus, the camera device 103, the facial image input unit 104, and the facial image analysis unit 109 provided for acquiring the muscular activity data of the performer in this way are constituent elements of a muscle length measuring instrument in the present embodiment, and this muscle length measuring instrument is an example of a muscular activity measuring instrument.

The configuration of practice support data stored in the practice support data storage unit 105 in the present embodiment is basically the same as the configuration of the practice support data of embodiment 1 depicted in FIG. 2 and therefore an explanation thereof is omitted. However, muscular activity included in a condition having muscular activity as a variable in the present embodiment is expressed as a value for muscle length.

It should be noted that the hardware configuration of an information processing device that realizes the practice support device 20 in the present embodiment is basically the same as the configuration of the practice support device 10 of embodiment 1 depicted in FIG. 4 and therefore an explanation thereof is omitted. However, in the practice support device 20, the facial image analysis unit 109 is also realized by the CPU 403 executing processing specified by a practice support program with the RAM 402 serving as a work area. Furthermore, in the present embodiment, the camera device 103 of FIG. 6 corresponds to the sensors 406.

[Operation]

FIG. 7 is a flowchart describing an example of an operation of the practice support device 20 in the present embodiment. In the operation of the practice support device 20, compared to the operation of the practice support device 10 in embodiment 1, a step for analyzing a facial image is added following the step for acquiring facial image data.

First, in step S11, the facial image input unit 104 acquires facial image data indicating a facial image captured by the camera device 103, and outputs this facial image data to the facial image analysis unit 109 and the image combining unit 108.

Next, in step S12, the facial image analysis unit 109 analyzes the facial image data input in step S11 to thereby acquire a value for muscle length, and outputs this acquired value for muscle length to the muscular activity input unit 102 as muscular activity data indicating muscular activity.

Furthermore, in step S13, the muscular activity input unit 102 outputs the muscular activity data acquired by analysis by the facial image analysis unit 109, to the condition determining unit 106 and the practice support image acquisition unit 107.

Next, in step S14, the condition determining unit 106 refers to the practice support data 1050 stored in the practice support data storage unit 105, and determines whether or not the muscular activity indicated by the muscular activity data input in step S13 satisfies a muscular activity condition included in the practice support data 1050. This condition determination is carried out on the basis of whether or not there is a change in muscle length or the magnitude of a change in said muscle length.

Next, in step S15, the practice support image acquisition unit 107 determines whether or not there is a muscular activity condition determined as having been satisfied as a result of the condition determination in step S14. When there is such a muscular activity condition (yes in step S15), the practice support image acquisition unit 107 acquires the practice support information associated with the satisfied condition in the practice support data 1050 (step S16).

Next, in step S17, the practice support image acquisition unit 107 visualizes the muscular activity data acquired in step S13 and the practice support information acquired in step S16, in other words, acquires practice support images, and outputs these practice support images to the image combining unit 108.

Lastly, in step S18, the image combining unit 108 combines the practice support images that are input from the practice support image acquisition unit 107 and a facial image that is input from the facial image input unit 104, and outputs the thus obtained composite image to be displayed by the display device 110.

(Effects)

According to this configuration, the practice support device 20 in the present embodiment is able to visualize, in a form that is easy to intuitively understand, muscular activity of the face of a performer when playing a wind instrument, acquired by analyzing facial image data, and is also able to superimpose and display said muscular activity in an appropriate position on a facial image of the performer obtained when playing, acquired from the camera device 103. Thus, the performer or instructor who is the user of the practice support device 20 is able to easily and accurately comprehend the muscular activity of the performer when playing a wind instrument.

In addition, in the practice support device 20, the camera device 103 and facial image analysis are used for the acquisition of muscular activity data and as an input means. That is, electromyographs are not required, which has is an effect in that it is possible to reduce the cost required to implement the present disclosure. Furthermore, contact-type sensors are not required, and therefore the time taken for the practice support device 20 to be prepared for use is shortened compared to a device that includes contact-type sensors. Furthermore, electromyographs do not have to be attached to the performer, and therefore practice can be performed in a state close to when playing as normal.

Hereinabove, an explanation has been given regarding the use of feature points in a facial image extracted by means of face recognition, as a means for obtaining a muscular activity data state from facial image data; however, it should be noted that the present disclosure is not restricted thereto. For example, a plurality of markers may be affixed to specific positions on the face of the performer, images of the markers may be detected as feature points within the facial image by means of image analysis, and muscle length may be calculated by obtaining the distance between a specific pair of markers on the basis of the positions of each marker. These markers are arranged in such a way that it is possible for the muscle length of a specific muscle of the face of the performer to be calculated.

Embodiment 3

[Configuration]

In the present embodiment, information regarding playing sound is used in addition to muscular activity as a condition variable used for a condition determination.

FIG. 8 is a block diagram depicting an example of a configuration of a practice support device 30 for a wind instrument in the present embodiment. In FIG. 8, a practice support system 3 for a wind instrument is provided with the practice support device 30, the myoelectric sensors 101, the camera device 103, the display device 110, and a microphone 111.

The practice support device 30 is provided with the muscular activity input unit 102, the facial image input unit 104, a practice support data storage unit 205, a condition determining unit 206, the practice support image acquisition unit 107, the image combining unit 108, and a playing sound input unit 112. Constituent elements common to embodiment 1 are denoted using common reference numerals and explanations thereof are omitted.

In FIG. 8, the microphone 111 picks up playing sound, and outputs data indicating the playing sound picked up (hereinafter, referred to as playing sound data).

The playing sound input unit 112 receives input of playing sound data that is output from the microphone 111, and outputs this playing sound data to the condition determining unit 206.

The practice support data storage unit 205 associates and stores, as practice support data 2050, conditions having muscular activity as a variable (hereinafter, also referred to as muscular activity conditions), conditions having playing sound as a variable (hereinafter, also referred to as playing sound conditions), and practice support information.

The condition determining unit 206 carries out a condition determination using the muscular activity data received from the muscular activity input unit 102, the playing sound data received from the playing sound input unit 112, and the conditions stored in the practice support data storage unit 205. In accordance with the result of this condition determination, the condition determining unit 206 outputs practice support information corresponding to the received muscular activity data and playing sound data.

FIG. 9 is a drawing depicting an example of the conditions and practice support information stored in the practice support data storage unit 205 in the present embodiment.

The practice support data storage unit 205 associates and stores the muscular activity conditions, the playing sound conditions, and the practice support information as the practice support data 2050. In FIG. 9, the conditions and practice support information in each data row of the table are associated. In this example, a muscular activity condition and a playing sound condition are associated by being implemented as one complex condition, and are then also associated with practice support information; however, it should be noted that these may associated with each other, and with the practice support information, as individual conditions.

In the muscular activity condition, muscular activity is given in a form corresponding to muscular activity data from the myoelectric sensors 101, and is given as myoelectric potential in the present embodiment, for example. In the playing sound condition, playing sound is indicated in a form corresponding to information based upon playing sound data from the microphone 111, and, for example, is indicated using pitch and sound pressure in the present embodiment. The practice support information associated with the muscular activity condition and the playing sound condition includes text information and image information. The text information is an example of language-dependent information relating to the muscular activity included in the muscular activity condition, presented to the performer when a muscular activity condition and playing sound condition have been satisfied. The image information is information relating to images such as a graphics with which muscular activity is visualized, and is information indicating a display mode for emphasizing a part requiring attention, for example, when a muscular activity condition and a playing sound condition have been satisfied.

It should be noted that the hardware configuration of an information processing device that realizes the practice support device 30 in the present embodiment is basically the same as the configuration of the practice support device 10 of embodiment 1 depicted in FIG. 4 and therefore an explanation thereof is omitted. However, in the practice support device 30, the playing sound input unit 112 is also realized by the CPU 403 executing processing specified by a practice support program with the RAM 402 serving as a work area. Furthermore, in the present embodiment, the myoelectric sensors 101, the camera device 103, and the microphone 111 of FIG. 8 correspond to the sensors 406. Furthermore, input ports of the CPU 403 are examples of the first input circuit and a second input circuit in the present embodiment.

[Operation]

FIG. 10 is a flowchart depicting an example of an operation of the practice support device 30 in the present embodiment. In the operation of the practice support device 30, compared to the operation of the practice support device 10 in embodiment 1, a step for acquiring playing sound data is added. First, in step S21, the facial image input unit 104 acquires facial image data indicating a facial image captured by the camera device 103, and outputs this facial image data to the image combining unit 108. Furthermore, in step S22, the muscular activity input unit 102 acquires muscular activity data indicating muscular activity measured by the myoelectric sensors 101, and outputs this muscular activity data to the condition determining unit 206 and the practice support image acquisition unit 107. Furthermore, in step S23, the playing sound input unit 112 acquires playing sound data indicating playing sound picked up by the microphone 111, and outputs this playing sound data to the condition determining unit 206.

Next, in step S24, the condition determining unit 206 refers to the practice support data 2050 stored in the practice support data storage unit 205, and carries out a condition determination based upon muscular activity conditions and playing sound conditions. The condition determining unit 206 performs a determination as to whether or not the muscular activity indicated by the muscular activity data that is input in step S22 and the playing sound indicated by the playing sound data that is input in step S23 satisfy each muscular activity condition and playing sound condition included in the practice support data 2050.

Next, in step S25, the practice support image acquisition unit 107 determines whether or not an associated muscular activity condition and playing sound condition have been satisfied as a result of the condition determination in step S24. When the practice support data 2050 of FIG. 9 is used, it is determined whether or not there is a complex condition that has been satisfied, from among the complex conditions of muscular activity conditions and playing sound conditions. When an associated muscular activity condition and playing sound condition have been satisfied (yes in step S25), the practice support image acquisition unit 107 acquires the practice support information associated with these satisfied conditions in the practice support data 2050 (step S26).

Next, in step S27, the practice support image acquisition unit 107 visualizes the muscular activity data state acquired in step S22 and the practice support information acquired in step S26, in other words, acquires practice support images, and outputs these practice support images to the image combining unit 108.

Lastly, in step S28, the image combining unit 108 combines the practice support images that are input from the practice support image acquisition unit 107 and a facial image that is input from the facial image input unit 104, and outputs the thus obtained composite image to be displayed by the display device 110.

(Effects)

According to this configuration, the practice support device 30 in the present embodiment is able to visualize, in a form that is easy to intuitively understand, muscular activity of the face of a performer when playing a wind instrument, acquired from electromyographs, and is also able to superimpose and display said muscular activity in an appropriate position on a facial image of the performer obtained when playing, acquired from a camera. Thus, the performer or instructor who is the user of the practice support device 30 is able to easily and accurately comprehend the muscular activity of the performer when playing a wind instrument.

Furthermore, the practice support device 30 also uses playing sound as a variable, and is thereby able to support conditions that cannot be handled using muscular activity alone, conditions relating to playing technique, for example, and it becomes possible to provide a greater variety of practice support information.

Furthermore, the time-sequential data of muscular activity, facial images, and playing sound obtained while playing may be temporarily stored in the external storage device 405 and then used. In this case, in the practice support device 30, muscular activity data, facial image data, and playing sound data obtained while playing and stored in the external storage device 405 are read out according to the time-sequential order of playing for the aforementioned series of processing to be carried out, and a composite image that includes practice support images is thereby output. Furthermore, in the present embodiment, a speaker (not depicted) may be mounted on or connected to the practice support device 30, and playing sound may also be combined and played when practice support images are reviewed and played back.

Embodiment 4

[Configuration]

In embodiment 4, an explanation will be given regarding a configuration in which a condition and practice support information associated therewith are selected and designated on the basis of a practice support subject.

Figure 11:
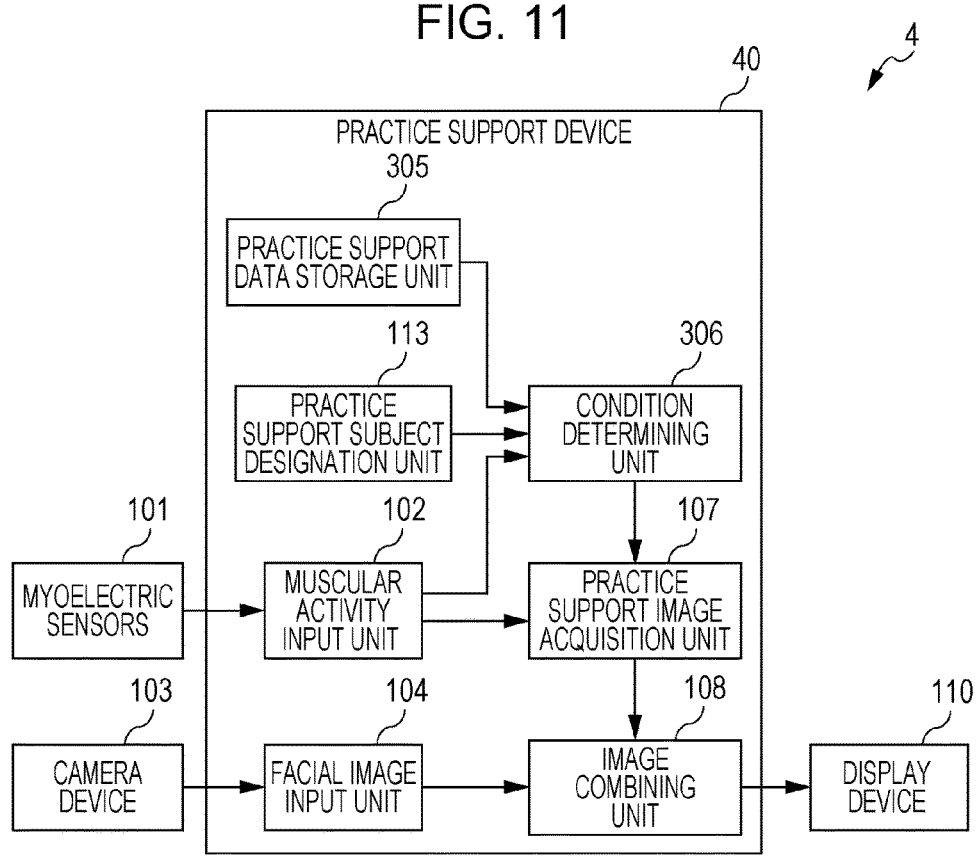
FIG. 11 is a block diagram depicting an example of a configuration of a practice support device for a wind instrument in embodiment 4.

FIG. 11 is a block diagram depicting an example of a configuration of a practice support device 40 for a wind instrument in the present embodiment. In FIG. 11, a practice support system 4 for a wind instrument is provided with the practice support device 40, the myoelectric sensors 101, the camera device 103, and the display device 110.

The practice support device 40 is provided with the muscular activity input unit 102, the facial image input unit 104, a practice support data storage unit 305, a condition determining unit 306, the practice support image acquisition unit 107, the image combining unit 108, and a practice support subject designation unit 113. Constituent elements common to embodiment 1 are denoted using common reference numerals and explanations thereof are omitted.

In FIG. 11, the practice support subject designation unit 113, in accordance with the musical instrument and performer constituting a practice support subject, selects appropriate items from among a plurality of conditions and practice support information associated with each condition stored in the practice support data storage unit 305, and designates such items to be used to support practice.

In the present embodiment, in the practice support data storage unit 305, each set of a condition having muscular activity as a variable and practice support information associated with the condition (hereinafter, referred to as a condition-support information set), included in the practice support data, is classified and managed. For example, in the practice support data storage unit 305, a plurality of condition-support information sets included in the practice support data are managed using classification information that indicates a classification to which each condition-support information set belongs.

An identifier that indicates the type of wind instrument, for example, is used for the classification information. The type of the wind instrument may be a middle classification such as a brass instrument or a woodwind instrument, for example, or may be a more specific type such as a trumpet, a horn, a trombone, a clarinet, or a saxophone. Thus, when supporting practice, the practice support device 40 is able to use only the condition-support information set that corresponds to the musical instrument played by the performer. Consequently, the performer is able to receive practice support information, in other words, advice, which relates to the musical instrument he or she is practicing.

It should be noted that the classification information is not restricted to information relating to the type of musical instrument.

For example, in the practice support device 40, it is possible to use practice support data that includes a condition having muscular activity indicated by muscle length as a variable, indicated in embodiment 2. For example, in the practice support data storage unit 40, if it is possible for the input muscular activity data to be switched between myoelectric potential data and muscle length data, classification information may be used that corresponds to whether the condition included in each condition-support information set has muscular activity indicated by either myoelectric potential or muscle length as a variable.

Furthermore, information relating to attributes of the performer may be used as the classification information. Possible examples of attributes of the performer include proficiency and physical characteristics. For example, condition-support information sets in which different threshold values are included in conditions are selected according to proficiency, lip thickness, and teeth alignment.

The condition determining unit 306 carries out a condition determination using muscular activity data received from the muscular activity input unit 102 and the conditions included in practice support data stored in the practice support data storage unit 305. A condition designated by the practice support subject designation unit 113 is then used for the determination in this condition determination.

It should be noted that the hardware configuration of an information processing device that realizes the practice support device 40 in the present embodiment is basically the same as the configuration of the practice support device 10 of embodiment 1 depicted in FIG. 4 and therefore an explanation thereof is omitted. However, in the practice support device 40, the practice support subject designation unit 113 is also realized by the CPU 403 executing processing specified by a practice support program with the RAM 402 serving as a work area.

Furthermore, the practice support subject designation unit 113 may receive input of information relating to the musical instrument or performer constituting a practice support subject, from outside by way of an input interface. Furthermore, the practice support subject designation unit 113 may acquire information relating to the musical instrument or performer constituting a practice support subject, from an image captured by the camera device 103. Furthermore, in the practice support device 40, it is also possible to use practice support data that includes a condition having playing sound input from a microphone such as that given in embodiment 3 as a variable. In this case, the practice support subject designation unit 113 may acquire information relating to the musical instrument or performer constituting a practice support subject, from the playing sound.

Furthermore, a configuration has been adopted in which the practice support subject designation unit 113 designates an appropriate set from the plurality of condition-support information sets stored in the practice support data storage unit 305, but there is no restriction thereto. For example, the practice support device 40 may acquire, from outside, a condition-support information set that belongs to a classification retained by the practice support subject designation unit 113, and store the condition-support information set as practice support data in the practice support data storage unit 305. In this case, for example, the practice support device 40 connects, via a network, to a server that retains a large quantity of practice support data, and acquires an appropriate condition-support information set.

(Effects)

According to this configuration, the practice support device 40 in the present embodiment is able to visualize, in a form that is easy to intuitively understand, muscular activity of the face of a performer when playing a wind instrument, acquired from a muscular activity measuring instrument such as an electromyograph, and is also able to superimpose and display said muscular activity in an appropriate position on a facial image obtained when playing, acquired from a camera. Thus, the performer or instructor who is the user of the practice support device 40 is able to easily and accurately comprehend the muscular activity of the performer when playing a wind instrument.

Furthermore, it becomes possible to designate a related condition-support information set in accordance with the practice support subject (attributes of the performer, type of musical instrument, or the like), and practice support information can be presented in a more appropriate manner.

(Specific Examples of Modes of Use)

Here, for greater understanding of the practice support device according to the present disclosure described in the aforementioned embodiments, an explanation will be given regarding support for the practice of a wind instrument that can be realized by means of this practice support device, using specific examples of modes of use of this practice support device.

As a premise for this understanding, an explanation regarding the relationship between playing a wind instrument and the facial muscles will be added. As mentioned above, appropriate facial muscle activity is an important element when playing a wind instrument, and it has been found that there are differences in the way that facial muscles are used between a non-proficient performer and a proficient performer. However, when playing a wind instrument, there are many points to which attention should be paid such as the musical score, fingering, breathing, and the sound that is actually being created. Furthermore, there are a plurality of facial muscles involved in playing a wind instrument, and, moreover, it is not easy to be aware of the activity of each muscle individually. Furthermore, even if a performer who is playing is objectively observed by an instructor or by watching a video recording, there is also muscular activity that does not appear on the surface of the skin (isometric contractions), and it is difficult to comprehend whether the muscular activity is appropriate. Consequently, even for a person who understands findings such as the aforementioned, there are cases where there is no choice but to adopt the approach of determining or inferring whether or not muscular activity is appropriate on the basis of the suitability of the sound produced. Furthermore, for example, when it is necessary to activate a plurality of muscles in an appropriate manner in order to stabilize sound, it is difficult to specify a muscle with which there is an activity-related problem even when the sound is unstable.

Compared to this approach, a performer or instructor using the practice support device according to the present disclosure is able to easily and more precisely comprehend the activity of the individual muscles used for playing. It is therefore possible to obtain information regarding advice based upon a comparison between the muscular activity carried out for playing and model muscular activity for producing appropriate sound, rather than the sound produced as a result of playing by the performer. The following are specific examples of modes of use thereof.

EXAMPLE 1

Figure 12:
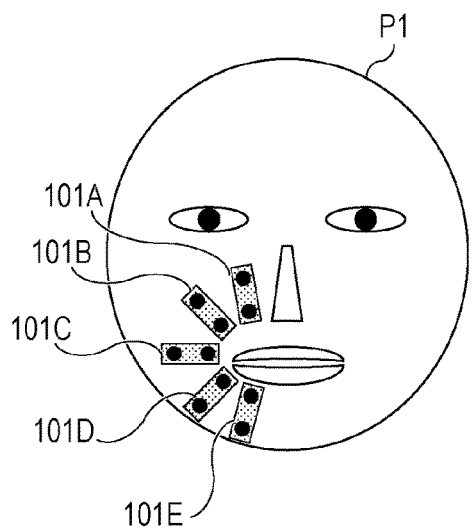
FIG. 12 is a drawing depicting an example of the attachment of myoelectric sensors in a specific example of a mode of use of the aforementioned practice support device.

FIG. 12 is a drawing depicting an example of the attachment of the myoelectric sensors 101 in a specific example of a mode of use of the practice support device. The black dots in the drawing represent electrodes of the myoelectric sensors 101.

In this example, five myoelectric sensors 101 are used, namely myoelectric sensors 101A to 101E. The myoelectric sensor 101A is attached at a position for measuring the myoelectric potential of the levator labii superioris muscle of a performer P1. The myoelectric sensor 101B is attached at a position for measuring the myoelectric potential of the zygomaticus major muscle of the performer P1. The myoelectric sensor 101C is attached at a position for measuring the myoelectric potential of the risorius muscle of the performer P1. The myoelectric sensor 101D is attached at a position for measuring the myoelectric potential of the depressor anguli oris muscle of the performer P1. The myoelectric sensor 101E is attached at a position for measuring the myoelectric potential of the depressor labii inferioris muscle of the performer P1. These muscles of which the myoelectric potential is measured in this example are examples of muscles around the mouth that are used to play a wind instrument.

FIG. 13 depicts an example of the visualization of muscular activity based upon myoelectric potential measured by the myoelectric sensors 101 attached in this way. In this example, muscular activity is visualized using five circular images 302 (302A to 302E) displayed superimposed on a facial image P301 of the performer P1. The five circular images 302 are displayed in positions corresponding to the position of each muscle on the facial image P301, in such a way as to indicate the aforementioned five muscles. Furthermore, the myoelectric potentials of the muscles in each position are indicated by differences in color in the images 302, for example, differences in shade. However, in FIG. 13, these differences in color are expressed by the density of dots. It should be noted that this kind of input facial image P301, which has superimposed thereon the images 302 having colors based upon myoelectric potential values, may be displayed while the performer P1 is playing and the camera device 103 is capturing images. Furthermore, the images 302 are shown on the both the right and left sides of the face in FIG. 3, but since the activity of the facial muscles while playing is basically right-left symmetrical, measurement and display of the myoelectric potential may be performed on only either the right or left of the face as in this specific example of a mode of use.

It should be noted that, in this specific example of a mode of use, there is a microphone as well as the myoelectric sensors 101, as an input device of the practice support device. Consequently, the practice support device of the present example is able to determine whether or not muscular activity occurring in the performer P1 is appropriate for the playing sound. Practice support data such as that depicted in FIG. 14 is used for this kind of determination. FIG. 14 is a drawing depicting an example of practice support data that is stored by the practice support data storage unit of the practice support device.

A condition and practice support information associated with the condition are stored in each row in the practice support data. The condition in each row includes a condition having playing sound as a variable and a condition having muscular activity as a variable. In the first row in FIG. 14, the condition having playing sound as a variable is "musical instrument sound changes from absent to present", and the condition having muscular activity as a variable is "myoelectric potential of any region changes". This kind of condition-information set is prepared on the basis of the finding that a non-proficient performer does not prepare the embouchure (state of the mimetic muscles) before sound is produced and there is a change in the muscular activity (myoelectric potential) of the mimetic muscles before and after sound is produced, whereas such a change is not seen with a proficient performer. A specific example of this condition determination carried out by the condition determining unit of the practice support device will be described with reference to FIG. 15.

Figure 15:
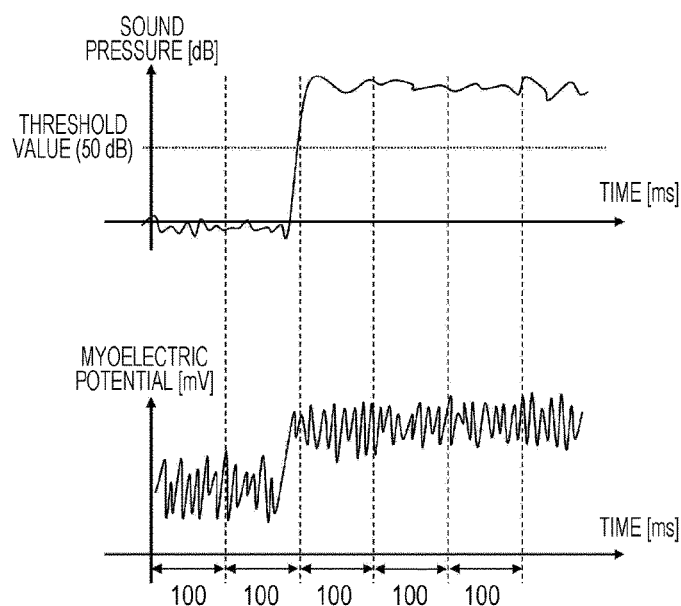
FIG. 15 is a drawing depicting an example of playing sound data and muscular activity data that is acquired in a specific example of a mode of use of the aforementioned practice support device.

FIG. 15 is a drawing depicting an example of playing sound data acquired by the microphone and muscular activity data acquired by myoelectric sensors, in this specific example of a mode of use. In the practice support device, the condition determining unit performs a condition determination on the basis of these items of data, which are accumulated for a fixed time. A unit segment of time in which data is accumulated is referred to as a frame, and one frame is 100 milliseconds in this example.

With regard to the determination of a change from the musical instrument sound being absent to being present, it is determined that said change has occurred when the average value of the sound pressure in a frame of interest exceeds a threshold value, and when the sound pressure in the immediately preceding frame is equal to or less than the threshold value, for example. In the example of FIG. 15, 50 dB is used as the threshold value, and it is determined that a change from sound being absent to being present occurred from the second frame from the left in the drawing to the third frame.

Furthermore, a change in myoelectric potential is detected by means of statistical processing, for example. Specifically, a Mann-Whitney U test is carried out with respect to two data groups corresponding to consecutive frames, and when a significant difference is confirmed, it is determined that the myoelectric potential has changed between frames. The significance level is 0.01. In the example of FIG. 15, there is a high possibility of it being determined that the myoelectric potential has changed from the second frame from the left in the drawing to the third frame.

It should be noted that each aforementioned method used for the condition determination and the numerical values of the frame length, the threshold value, the significance level, and the like used for this condition determination are merely examples, and the present disclosure is not restricted thereto.

Figure 16:
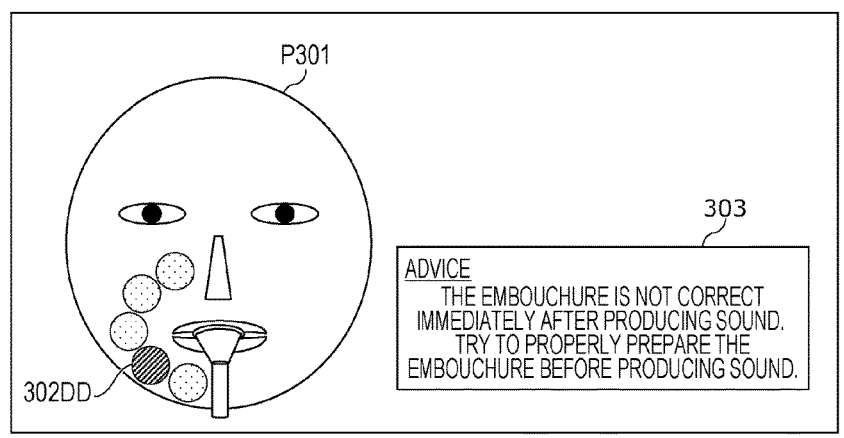
FIG. 16 is a drawing depicting an example of an image that includes practice support information, displayed in a specific example of a mode of use of the aforementioned practice support device.

A scenario is assumed in which it is determined that, in the data indicated in FIG. 15, a change from sound being absent to being present has occurred from the second frame from the left in the drawing to the third frame, and the myoelectric potential measured by any of the myoelectric sensors has also changed. In this case, the condition in the first row is satisfied, and therefore the practice support image acquisition unit of the practice support device acquires practice support images on the basis of the practice support information in the same row as this condition. The image combining unit then combines those practice support images and the facial image P301 of the performer P1 at that time, and acquires a composite image such as that depicted in FIG. 16. FIG. 16 depicts an example of a composite image that includes practice support information, displayed on a display device when the condition in the first row has been satisfied.

In FIG. 16, the five images 302 indicating muscular activity based upon myoelectric potential are superimposed in the same locations as in FIG. 13, on the facial image P301 of the performer P1. From among the five images 302, the image 302 representing the depressor anguli oris muscle is displayed using an image 302DD having a different display mode to other images 302 for emphasis. For the different display mode, for example, the color system (warm colors and cold colors) is altered from that of the other images 302, or the image 302 to be emphasized is made to blink or flash. In this example, an image 302 having an altered color system is used to thereby indicate that a change in the myoelectric potential of the depressor anguli oris muscle has been detected. This kind of change in the display mode is realized by, when the condition in the first row of the table in FIG. 14 has been satisfied, the practice support image acquisition unit acquiring practice support images 302 by means of said images being generated and so forth on the basis of image information of the practice support information associated with said condition, and the image combining unit arranging each image 302 in an appropriate position. It should be noted that the image 302DD may also have the color altered within the range of the same color system or have the speed of blinking or flashing altered in accordance with the myoelectric potential of the depressor anguli oris muscle. Furthermore, only the image 302 to be emphasized may be displayed in the composite image. The image 302DD is a first practice support image in the present example.

Furthermore, the composite image of FIG. 16 includes an image 303 that includes the text information of the practice support information. This kind of display is realized by, when the condition in the first row of the table in FIG. 14 has been satisfied, the practice support image acquisition unit acquiring a practice support image 303 by means of said image being generated or the like on the basis of the text information of the practice support information associated with said condition, and the image combining unit combining images in such a way that the image 303 is arranged in a predetermined position. Thus, the performer P1 is able to obtain more detailed information relating to improving the muscular activity indicated by the image 302DD.

For an instructor or performer P1 who does not use the practice support device, it is easy for the performer P1 to fall out of tune when producing sound, or, even if the cause thereof is known to be insufficient preparation of the embouchure, it is difficult to comprehend details such as the region of the face to which attention should be paid. However, a performer P1 who has used the practice support device and seen a composite image such as that depicted in FIG. 16 on a display device, is able to know precisely his or her own habits regarding muscular activity, and is able to comprehend detailed points of improvement, for example, regions that he or she should be strongly aware of in particular.

Figure 17:
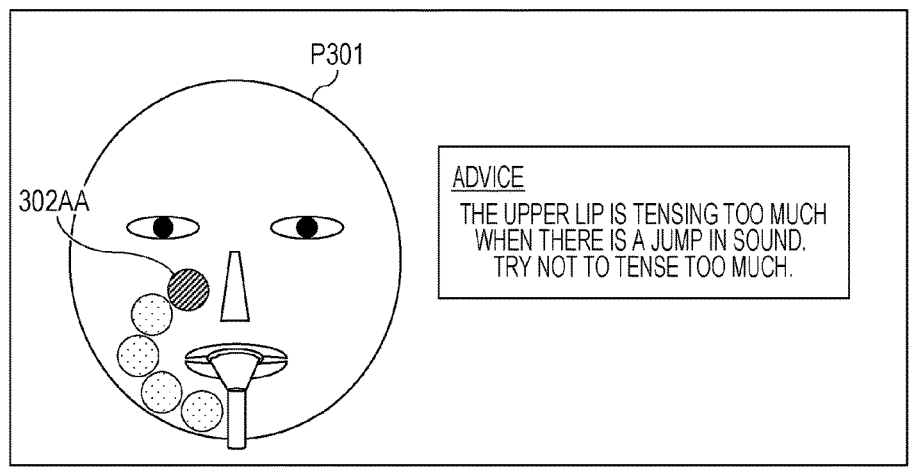
FIG. 17 is a drawing depicting another example of an image including practice support information, displayed in a specific example of a mode of use of the aforementioned practice support device.

FIG. 17 is an example of a composite image that is displayed when the condition in the second row of the table in FIG. 14 has been satisfied in a condition determination. In this example, the condition having playing sound as a variable is that the musical interval of the playing sound rises. Furthermore, the condition having muscular activity as a variable is that the myoelectric potential of the levator labii superioris muscle rises. Similar to the condition determination for the condition in the first row, the condition determination of this example can also be carried out by performing a comparison with a threshold value or statistical processing, for example, on the basis of the playing sound data and muscular activity data. In FIG. 17, emphasized display for directing the attention of the performer P1 to the levator labii superioris muscle is implemented using an image 302AA that indicates the levator labii superioris muscle. The image 302AA is a second practice support image in the present example.

It should be noted that the quantity and attachment positions of myoelectric sensors 101 attached during use of the practice support device are not restricted to the aforementioned example. For example, in order to perform a condition determination based upon the condition in the first row of the table in FIG. 14, typically the myoelectric potentials of a plurality of muscles around the mouth are measured as in the aforementioned example. However, it is not necessary for the myoelectric potential of all of the muscles in the aforementioned example to always be measured. For example, a performer P1 who is already aware of a muscle generating unnecessary force when producing sound may use the practice support device with only a myoelectric sensor 101 being attached to that muscle for measuring the myoelectric potential thereof. Furthermore, a condition determination based upon the condition in the second row of the table in FIG. 14 can be carried out with only the myoelectric potential of the levator labii superioris muscle being measured. Consequently, for example, when the performer P1 is using the practice support device to practice in order to overcome the habit indicated by this condition in the second row, only a myoelectric sensor 101A that measures the myoelectric potential of the levator labii superioris muscle may be attached.

EXAMPLE 2

Next, a specific example in which values for muscle length rather than myoelectric potential are used as muscular activity data will be described. As mentioned above, there is muscular activity that can be visually sensed from the surface of the skin and there is muscular activity that cannot be visually sensed from the surface of the skin. Of the aforementioned types, muscular activity that can be sensed using a measurement value for muscle length corresponds to muscular activity that can be sensed also from the surface of the skin. Hereinafter, an explanation will be given regarding a specific example of a mode of use of a practice support device in which markers affixed to the surface of the face of the performer are used to measure muscle length.

Figure 18:
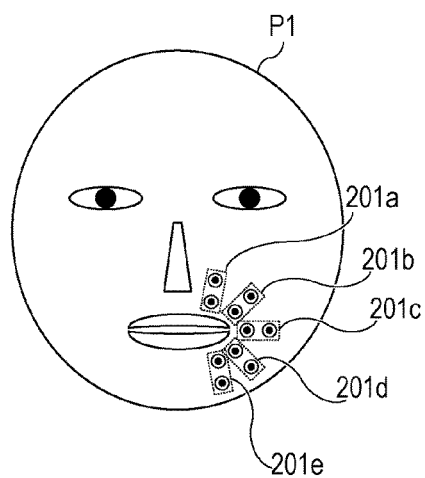
FIG. 18 is a drawing depicting an example of the attachment of markers in a specific example of a mode of use of the aforementioned practice support device.

FIG. 18 is a drawing depicting an example of the attachment of markers in a specific example of a mode of use of the practice support device. The white circles including black dots in the drawing are markers, and the muscle length of one muscle is measured by means of image analysis in which one pair of two dots enclosed by a rectangular dotted line (hereinafter, referred to as a marker pair) is used as a feature point.

In this example, five pairs of marker pairs 201 are used, namely marker pairs 201a to 201e. The marker pair 201a is attached at a position for measuring the muscle length of the levator labii superioris muscle of the performer P1. The marker pair 201b is attached at a position for measuring the muscle length of the zygomaticus major muscle of the performer P1. The marker pair 201c is attached at a position for measuring the muscle length of the risorius muscle of the performer P1. The marker pair 201d is attached at a position for measuring the muscle length of the depressor anguli oris muscle of the performer P1. The marker pair 201e is attached at a position for measuring the muscle length of the depressor labii inferioris muscle of the performer P1. These muscles of which the muscle length is measured in this example are examples of muscles around the mouth that are used to play a wind instrument.

FIG. 19 depicts an example of the visualization of muscular activity based upon muscle length measured using the marker pairs 201 attached in this way. In this example, muscular activity is visualized using five linear images 302 (302a to 302e) displayed superimposed on a facial image P301 of the performer P1. The five linear images 302 are arranged in the directions in which each muscle extends, in positions corresponding to the positions of each muscle on the facial image P301, in such a way as to indicate the aforementioned five muscles. Furthermore, the length of each image 302 corresponds to the distance between the markers of each of the aforementioned marker pairs 201, and indicates muscle length. It should be noted that this kind of input facial image P301, which has superimposed thereon the images 302 having lengths that are based upon values for muscle length, may be displayed while the performer P1 is playing and the camera device 103 is capturing images. Furthermore, in the same way as in example 1, the measurement and display of muscle length may be performed on only either the right or left of the face.

It should be noted that, in the present example, as well as the camera device that captures facial images including images of the marker pairs 201, there is a microphone as an input device of the practice support device. Although not described in embodiments 2 or 3, muscular activity data based upon muscle length can also be used as a condition together with playing sound data. Consequently, the practice support device of the present example is able to determine whether or not muscular activity occurring in the performer P1 is appropriate for the playing sound. Practice support data such as that depicted in FIG. 20 is used for this kind of determination. FIG. 20 is a drawing depicting an example of practice support data that is stored by the practice support device. As described in embodiment 4, the practice support data of FIG. 14 and the practice support data of FIG. 20 may be included in the same table, for example, and may be selected in accordance with classification information.

A condition and practice support information associated with the condition are stored in each row in the practice support data. The condition in each row includes a condition having playing sound as a variable and a condition having muscular activity as a variable. In the first row of the table in FIG. 20, the condition having playing sound as a variable is "musical interval of musical instrument sound changes", and the condition having muscular activity as a variable is "no change in movement of skin surface of risorius muscle". This kind of condition-information set is prepared on the basis of the finding that it is easy for a high-pitch sound to be produced by the corners of the mouth being pulled to the right and left.

Similar to example 1, the condition determination performed by the condition determining unit can be carried out by performing a comparison with a threshold value or statistical processing, for example, on the basis of the muscular activity data and the playing sound data, which are accumulated for a fixed time.

Figure 21:
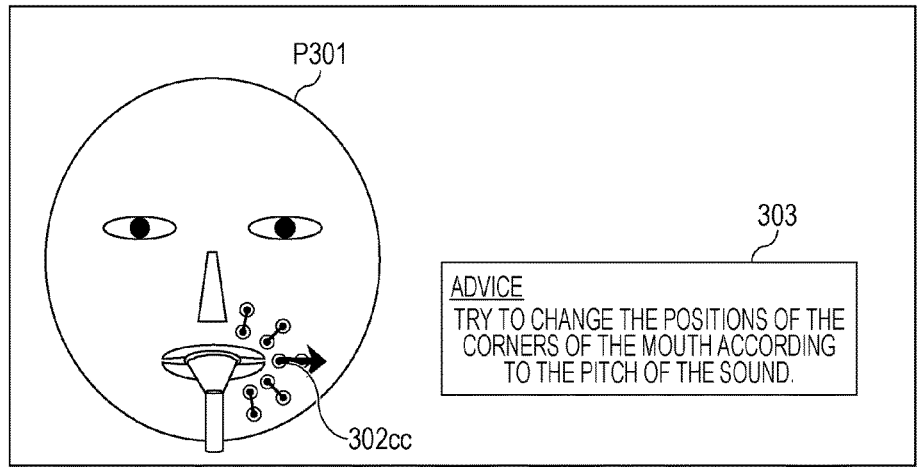
FIG. 21 is a drawing depicting another example of an image including practice support information displayed in a specific example of a mode of use of the aforementioned practice support device.

FIG. 21 is an example of a composite image that includes practice support information, displayed on a display device when the conditions in the first row of the table in FIG. 20 have been satisfied. A practice support image in this example is an image 302cc of an arrow mark that is superimposed on the marker pair 201c for measuring the muscle length of the risorius muscle. When the condition in the first row of the table in FIG. 20 has been satisfied, this arrow mark is acquired by the practice support image acquisition unit on the basis of the image information of "change graphic corresponding to activity of risorius muscle to arrow mark" associated with this condition, and is arranged in this position by the image combining unit. Thus, the performer P1 is able to know which region around the mouth should be moved and in which direction the region should be moved. In this example, the image 302cc indicates that the positions of the corners of the mouth should be changed in directions in such a way that the mouth widens to the right and left. The image 302cc is a third practice support image in the present example.

Furthermore, the composite image of FIG. 21 includes an image 303 that includes the text information of the practice support information. This kind of display is realized by, when the condition in the first row of the table in FIG. 20 has been satisfied, the practice support image acquisition unit acquiring the image 303 on the basis of the text information of the practice support information associated with this condition, and the image combining unit combining images in such a way that the image 303 is arranged in a predetermined position. Thus, the performer P1 is able to obtain more detailed information relating to improving the muscular activity indicated by the image 302cc. For example, a performer P1 using the practice support device for individual practice is able to see a composite image such as that depicted in FIG. 16 and easily and precisely know the facial regions that he or she should be aware of when the musical interval rises and details regarding improvement thereof.

Figure 22:
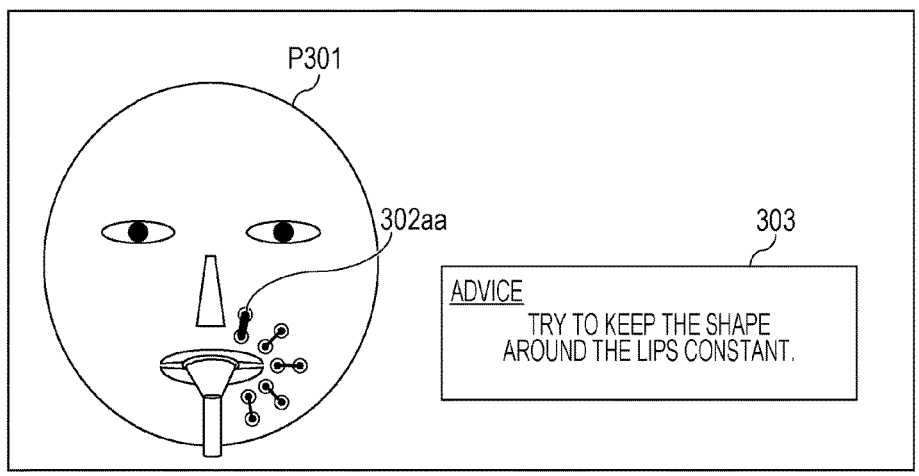
FIG. 22 is a drawing depicting another example of an image including practice support information displayed in a specific example of a mode of use of the aforementioned practice support device.

FIG. 22 is an example of a composite image that is displayed on a display device when the condition in the second row of the table in FIG. 20 has been satisfied in a condition determination. In this composite image, different from the example depicted in FIG. 21, it is indicated that there being no movement in the muscle of a specific region is a good state. Similar to the aforementioned condition determination, the condition determination of this example can also be carried out by performing a comparison with a threshold value or statistical processing, for example, on the basis of the playing sound data and muscular activity data. In FIG. 22, an image 302aa indicating the levator labii superioris muscle is a thicker linear image than the other images 302 for this region to be emphasized. The image 302aa is a fourth practice support image in the present example.

Furthermore, the composite image of FIG. 22 includes an image 303 that includes the text information of the practice support information. This kind of display is realized by, when the condition in the second row of the table in FIG. 20 has been satisfied, the practice support image acquisition unit acquiring the practice support image 303 on the basis of the text information of the practice support information associated with this condition, and the image combining unit combining images in such a way that the image 303 is arranged in a predetermined position. Thus, the performer P1 is able to practice changing the musical interval while taking care to suppress activity in the region indicated by the thick line.

It should be noted that the quantity and attachment positions of the marker pairs 201 attached when the practice support device is used are not restricted to the aforementioned example. Furthermore, a condition determination based upon the condition in the first row of the table in FIG. 20 can be carried out with only the muscle length of the risorius muscle being measured. Consequently, for example, when the performer P1 wishes to use the practice support device to practice the movement of the corners of the mouth when changing the musical interval, only the marker pair 201c that measures the myoelectric potential of the risorius muscle may be attached. For example, in order to perform a condition determination based upon the condition in the second row of the table in FIG. 20, typically the muscle lengths of a plurality of muscles around the mouth are measured as in the aforementioned example. However, it is not necessary for the muscle length of all of the muscles in the aforementioned example to always be measured. For example, a performer P1 who is already aware of a region that is liable to move when the musical interval rises may use the practice support device with only the marker pair 201 for measuring muscle length in that region being attached.

Other Embodiments

In the case where a microphone for picking up the playing sound of a performer is connected (including mounting) to the aforementioned practice support device, the processor may automatically carry out a condition determination using a condition included in practice support data when playing by the performer is detected, for example, when there is input of sound that is equal to or greater than a predetermined magnitude from the microphone. Thus, it is not necessary for a performer who uses the practice support device of the present disclosure in individual practice to perform an operation to start a determination via an input interface. The performer is able to receive practice support from when the musical instrument is taken up in order to play, without removing his or her hands from the musical instrument. Furthermore, a high degree of freedom with respect to the relationship between the practice support device and the performer is obtained.

It should be noted that it being permissible for a condition determination to be carried out when the magnitude of the playing sound is equal to or greater than a predetermined magnitude is not restricted to when a microphone is connected. For example, this processing may be carried out with respect to, in the data, segments in which the magnitude of the playing sound is equal to or greater than a predetermined magnitude, also when the practice support device reads out recorded video data or recorded sound data according to the time-sequential order to carry out the processing of the aforementioned embodiments. Thus, a segment to be subjected to processing is automatically specified even with recorded video data or recorded sound data that includes a recording from before or after playing, for example, and a high degree of convenience is realized.

Furthermore, in the case where a camera device for capturing facial images of the performer is additionally connected (including mounting) to the practice support device, the processor may automatically carry out a condition determination using a condition included in practice support data when an image of the face of the performer is included in an image acquired by the camera and there is input of sound that is equal to or greater than a predetermined magnitude from the microphone. Thus, a determination is performed only when it is possible to appropriately carry out a determination using a facial image or appropriately display the determination result, and it is therefore possible to avoid unnecessary playing due to assuming that a determination is being carried out, for example, and to improve the efficiency of practicing while receiving support. Furthermore, the performer may slightly alter the position or orientation of his or her body in order to temporarily stop a determination, and it is not necessary for the practice support device to be placed within reach of the performer. That is, a high degree of freedom with respect to the relationship between the practice support device and the performer is obtained.

It should be noted that it being permissible for a condition determination to be carried out when an image of the face of the performer is included is not restricted to when a camera is connected. For example, this processing may be carried out with respect to, in recorded video data, segments in which an image of the face of the performer is included and the magnitude of the playing sound is equal to or greater than a predetermined magnitude, also when the practice support device reads out recorded video data according to the time-sequential order to carry out the processing of the aforementioned embodiments. Thus, segments to be subjected to processing are automatically specified even with recorded video data that includes a recording from before or after playing, for example, and a high degree of convenience is realized.

Furthermore, it is also possible for the present disclosure to be realized as a practice support method for a wind instrument, in which each procedure of the processing executed by the practice support device in the embodiments is implemented as a step. Furthermore, it is also possible for the present disclosure to be realized as a program that causes this practice support method to be executed by various types of highly versatile information processing devices such as a personal computer, a tablet computer, or a smartphone, or by a device for supporting the practice of a wind instrument, provided with at least a processor and a memory. Furthermore, the present disclosure may be realized as a practice support system for a wind instrument, including a practice support device as well as an input device, such as a camera device, or a display device or both thereof.

In addition, modes in which various modifications conceived by a person skilled in the art have been implemented in the present embodiments, and modes constructed by combining the constituent elements in different embodiments may also be included within the embodiments of the present disclosure provided they do not depart from the purpose of the present disclosure. For example, the practice support device may receive, from a muscular activity measuring instrument, input of muscular activity data regarding both the myoelectric potential and muscle length of muscles in the surface of the face of a performer. Furthermore, the aforementioned allotment of the functions of each constituent element realized by a processor executing a program is exemplary and may be altered, and modes that are realized by these constituent elements and functions being arbitrarily combined are also included within the scope of the present disclosure.

Furthermore, the hardware configuration of each of the aforementioned practice support devices is not restricted to the aforementioned explanations. For example, the practice support device may be provided with another processor such as an auxiliary computation processing unit, and a portion of the aforementioned processing executed by a CPU may be executed by the other processor. Furthermore, the practice support device may be connected to each input/output device and an external storage device via a communication network such as the Internet. For example, facial image data and muscular activity data from sensors near a performer who is far away from the practice support device may be saved in a storage device in a server on a communication network, and the practice support device may access this storage device to acquire these items of data. A composite image may then be transmitted from the practice support device to a display near the performer via the communication network. It should be noted that, in this case, the input interface 407 also constitutes a portion of the information processing device being used by the performer, and is far away from the other constituent elements of the practice support device.

A practice support device for a wind instrument according to the present disclosure has a function to display practice support images based upon muscular activity, and is useful for the purpose of instructing the playing of a wind instrument in various types of educational institutions, or for the purpose of individual practice for a player of a wind instrument.

What is claimed is:

1. A device that supports a performer of a wind instrument, the device comprising:
   a processor; and
   a memory,
   wherein
   the processor acquires data indicating a myoelectric potential value measured by a myoelectric sensor arranged on a surface of a face of the performer, and acquires, from a microphone, sound of the wind instrument captured by the microphone,
   the memory stores a table including a listing of conditions for the myoelectric potential value and a corresponding listing of support information for playing the wind instrument, and
   the processor
      determines whether the acquired myoelectric potential value satisfies at least a portion of a target condition included in the listing of conditions,
      determines whether the acquired sound of the wind instrument satisfies another portion of the target condition,
      determines support information corresponding to the target condition,
      when the acquired myoelectric potential value is determined to satisfy the at least a portion of the target condition and when the acquired sound of the wind instrument is determined to satisfy the other portion of the target condition, generates a support image corresponding to the determined support information, and
      controls a display to display the generated support image.

2. The device according to claim 1, wherein
the at least a portion of the target condition includes a change in the myoelectric potential value, or a magnitude of the change in the myoelectric potential value that is equal to or greater than a predetermined threshold value.

3. The device according to claim 2, wherein
the myoelectric sensor measures the myoelectric potential value of one or more muscles from among a levator labii superioris muscle, a zygomaticus major muscle, a risorius muscle, a depressor anguli oris muscle, and a depressor labii inferioris muscle of the performer,
the change of the myoelectric potential value of the at least a portion of the target condition is a change of the myoelectric potential value of any of the levator labii superioris muscle, the zygomaticus major muscle, the risorius muscle, the depressor anguli oris muscle, and the depressor labii inferioris muscle,
the other portion of the target condition is a change in sound level from being absent to being present, and
the support image includes a facial image of the performer, with a part of the facial image corresponding to a muscle in which the myoelectric potential value has changed being emphasized.

4. The device according to claim 2, wherein
the myoelectric sensor measures the myoelectric potential value of a levator labii superioris muscle of the performer,
the change of the myoelectric potential value of the at least a portion of the target condition is a change of the myoelectric potential value of the levator labii superioris muscle,
the other portion of the target condition is a change in pitch of the wind instrument, and
the support image includes a facial image of the performer, with a part of the facial image corresponding to the levator labii superioris muscle being emphasized.

5. The device according to claim 1, wherein
the processor determines whether the acquired sound of the wind instrument satisfies the other portion of the target condition when the acquired sound of the wind instrument is equal to or greater than a predetermined magnitude.

6. The device according to claim 5, wherein
the processor further acquires an image captured by a camera, and
the processor determines whether the acquired myoelectric potential value satisfies the at least a portion of the target condition when a facial image of the performer is included in the image.

7. The device according to claim 1, wherein
the support image includes a facial image of the performer.

8. The device according to claim 1, wherein
the support information includes, as text information, advice regarding how to move a muscle corresponding to the target condition, and
the support image includes the text information.

9. The device according to claim 1, wherein
the support information includes, as text information, advice regarding how to move a muscle corresponding to the target condition, and
the processor causes a speaker to output a sound signal corresponding to the text information.

10. A device that supports a performer of a wind instrument, the device comprising:
a processor; and
a memory,
wherein the processor acquires an image including a facial image of the performer, from a camera that captures images of the performer,
the memory stores a table including a listing of conditions for a muscle length and a corresponding listing of support information for playing the wind instrument, and
the processor
determines a muscle length of a target muscle included in the facial image based on positions of a plurality of feature points in the facial image,
determines whether the determined muscle length satisfies at least a portion of a target condition included in the listing of conditions,
determines support information corresponding to the target condition,
when the determined muscle length is determined to satisfy the at least a portion of the target condition, generates a support image corresponding to the determined support information, and
controls a display to display the generated support image.

11. The device according to claim 10, wherein
the processor further acquires, from a microphone, sound of the wind instrument captured by the microphone,
the processor further determines whether the acquired sound of the wind instrument satisfies another portion of the target condition, and
when the processor determines that the acquired sound of the wind instrument satisfies the other portion of the target condition, the processor generates the support image.

12. The device according to claim 11, wherein
the at least a portion of the target condition includes a change in the muscle length, or a magnitude of the change in the muscle length that is equal to or greater than a predetermined threshold value.

13. The device according to claim 12, wherein
the processor determines the muscle length of a risorius muscle of the performer,
the change in the muscle length of the at least a portion of the target condition is no change in the muscle length of the risorius muscle,
the other portion of the target condition is a change in pitch of the sound of the wind instrument changes, and
the support image includes the facial image, with a part of the facial image corresponding to a corner of a mouth being emphasized.

14. The device according to claim 12, wherein
the processor determines the muscle length of one or more muscles from among a levator labii superioris muscle, a zygomaticus major muscle, a depressor anguli oris muscle, and a depressor labii inferioris muscle of the performer,
the change of the muscle length of the at least a portion of the target condition is a change in the muscle length of any of the levator labii superioris muscle, the zygomaticus major muscle, the depressor anguli oris muscle, and the depressor labii inferioris muscle,
the other portion of the target condition is a change in pitch of the sound of the wind instrument, and
the support image includes the facial image of the performer, with a part of the facial image corresponding to a muscle of which the muscle length has changed being emphasized.

15. The device according to claim 11, wherein
the processor determines whether the acquired sound of the wind instrument satisfies the other portion of the target condition when the acquired sound of the wind instrument is equal to or greater than a predetermined magnitude.

16. The device according to claim 10, wherein
the support image includes the facial image.

17. The device according to claim 10, wherein
the support information includes, as text information, advice regarding how to move a muscle corresponding to the target condition, and
the support image includes the text information.

18. The device according to claim 10, wherein
the support information includes, as text information, advice regarding how to move a muscle corresponding to the target condition, and
the processor causes a speaker to output a sound signal corresponding to the text information.

19. A method for supporting a performer of a wind instrument, the method including:
acquiring, by a processor of a computing device, data indicating a myoelectric potential value measured by a myoelectric sensor arranged on a surface of a face of the performer;
acquiring, from a microphone via the processor, sound of the wind instrument captured by the microphone;
with reference to a table in which a listing of conditions for the myoelectric potential value and a corresponding listing of support information for playing the wind instrument, determining, by the processor, whether the acquired myoelectric potential value satisfies at least a portion of a target condition included in the listing of conditions, and determining, by the processor, whether the acquired sound of the wind instrument satisfies another portion of the target condition;
determining, by the processor, support information corresponding to the target condition,
when the acquired myoelectric potential value is determined to satisfy the at least a portion of the target condition and when the acquired sound of the wind instrument is determined to satisfy the other portion of the target condition, generating, by the processor, a support image corresponding to the determined support information; and
displaying the generated support image on a display.

20. A method for supporting a performer of a wind instrument, the method including:
acquiring, by a processor of a computing device, an image including a facial image of the performer, from a camera that captures images of the performer;
determining, by the processor, a muscle length based on positions of a plurality of feature points in the facial image;
with reference to a table in which a listing of conditions for a muscle length and a corresponding listing of support information for playing the wind instrument, determining, by the processor, whether the determined muscle length satisfies a target condition included in the listing of conditions;

determining, by the processor, support information corresponding to the target condition;

when the determined muscle length is determined to satisfy the target condition, generating a support image corresponding to the determined support information; and displaying the generated support image on a display.

* * * * *